Nov. 6, 1934.  J. J. LYTH  1,979,334

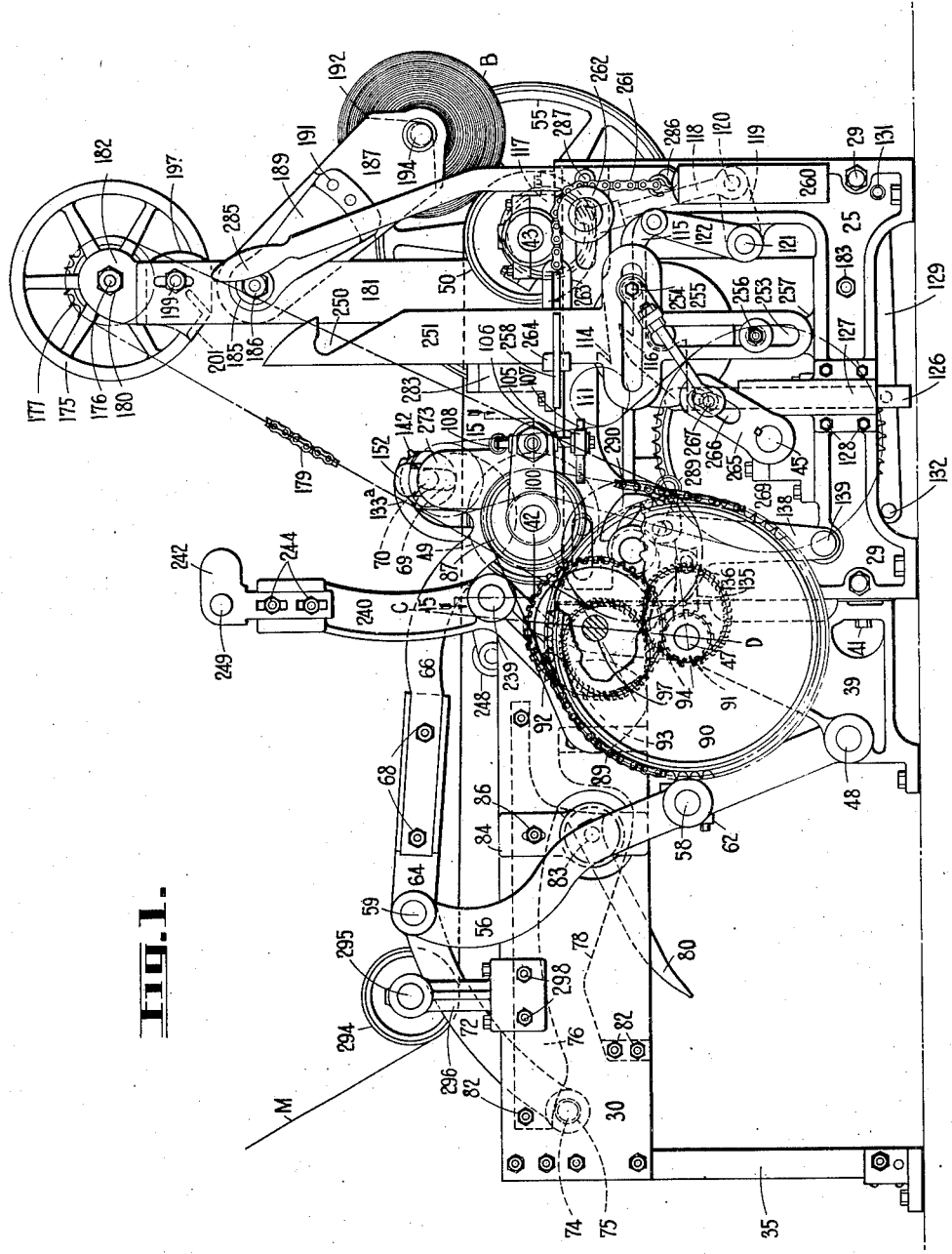

MACHINE FOR WINDING MATERIAL OF RIBBON LIKE FORM INTO ROLLS

Filed Feb. 20, 1931  11 Sheets-Sheet 2

JOHN J. LYTH.
INVENTOR

ATTORNEY

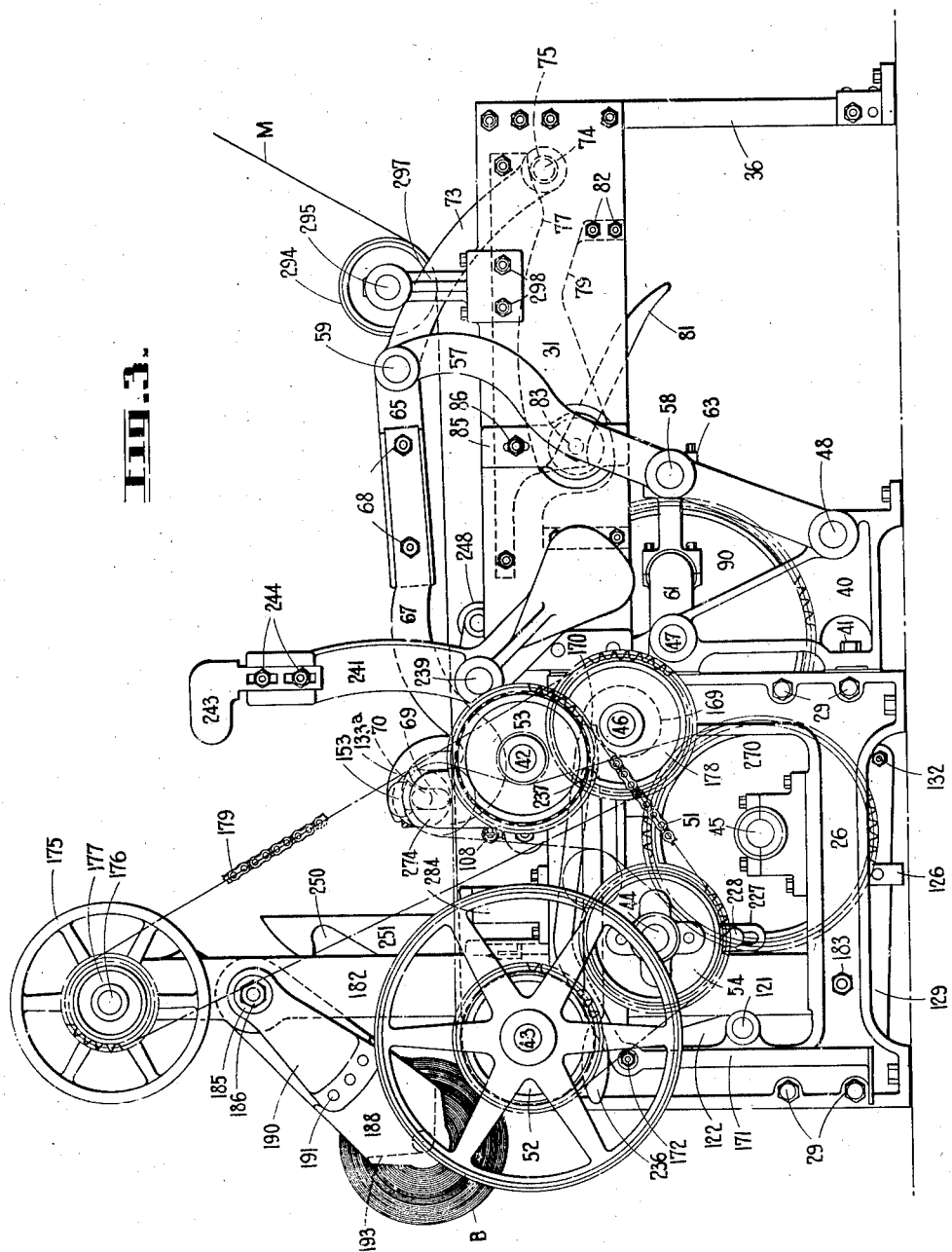

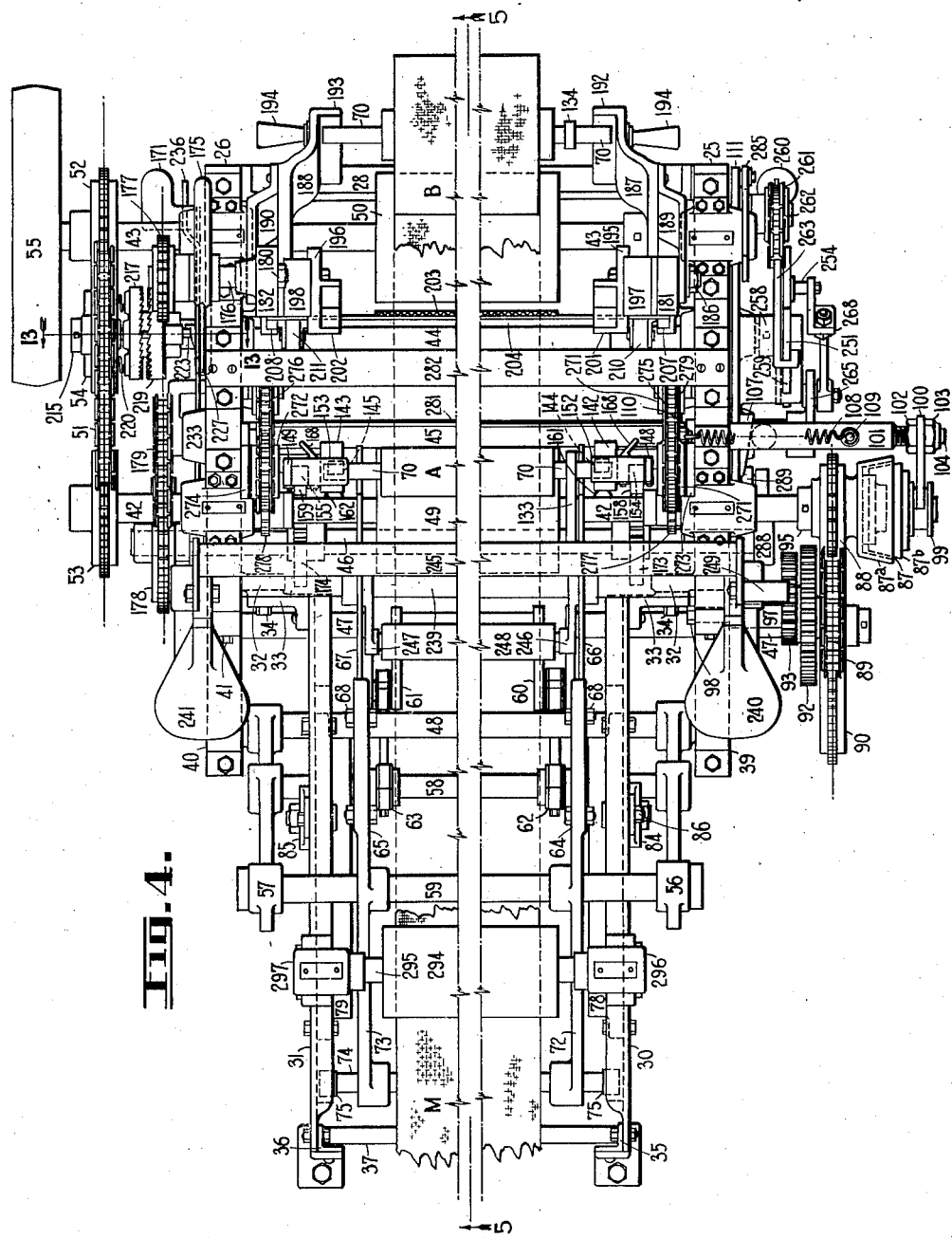

Nov. 6, 1934.   J. J. LYTH   1,979,334
MACHINE FOR WINDING MATERIAL OF RIBBON LIKE FORM INTO ROLLS
Filed Feb. 20, 1931   11 Sheets-Sheet 5

JOHN J. LYTH.
INVENTOR
ATTORNEY

Nov. 6, 1934.  J. J. LYTH  1,979,334
MACHINE FOR WINDING MATERIAL OF RIBBON LIKE FORM INTO ROLLS
Filed Feb. 20, 1931  11 Sheets-Sheet 6
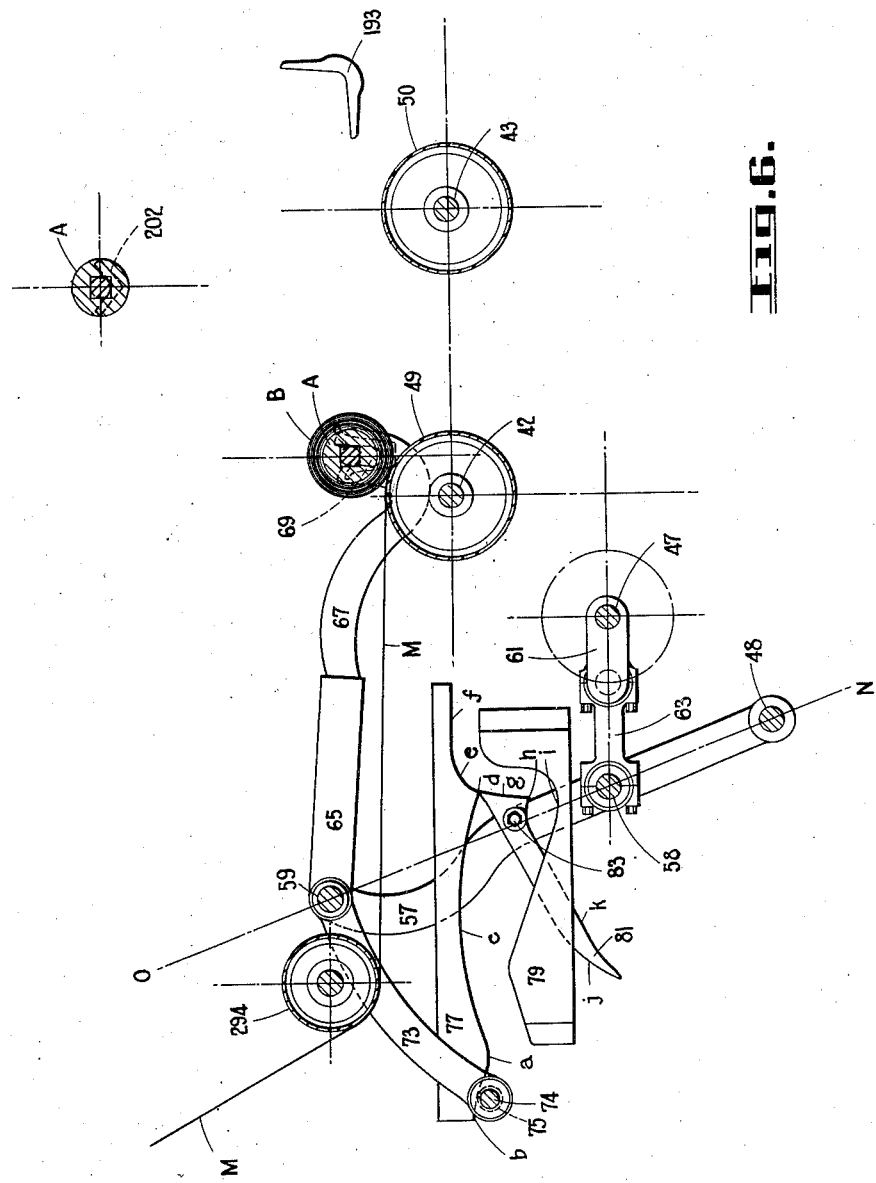

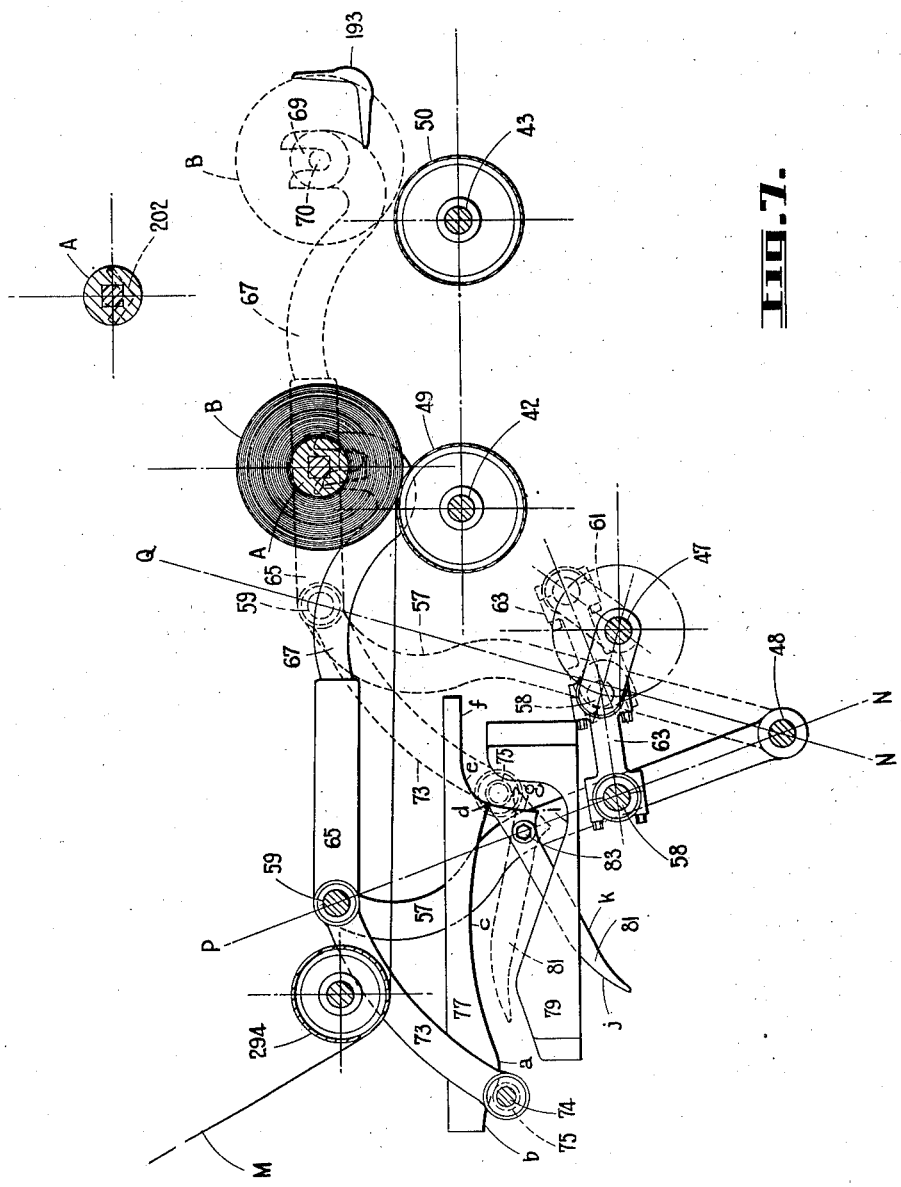

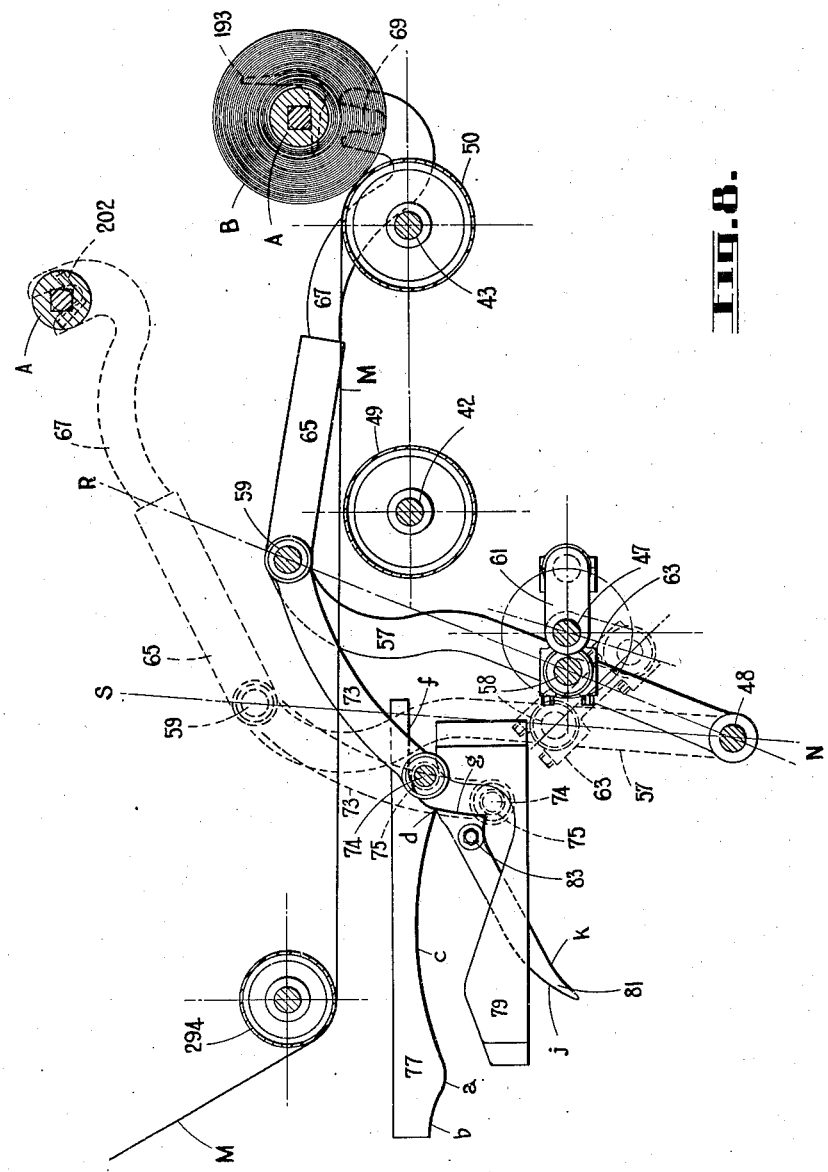

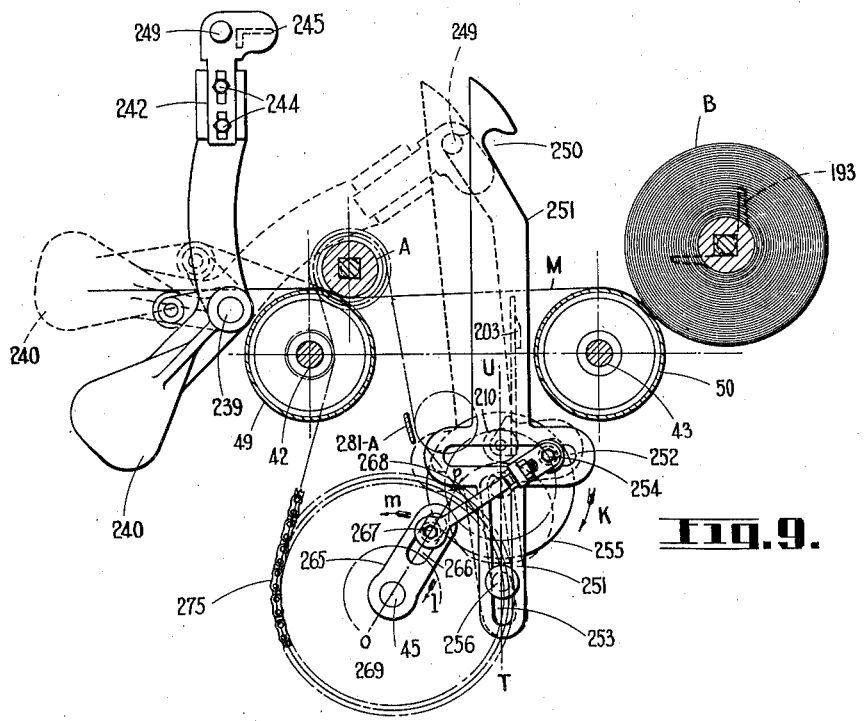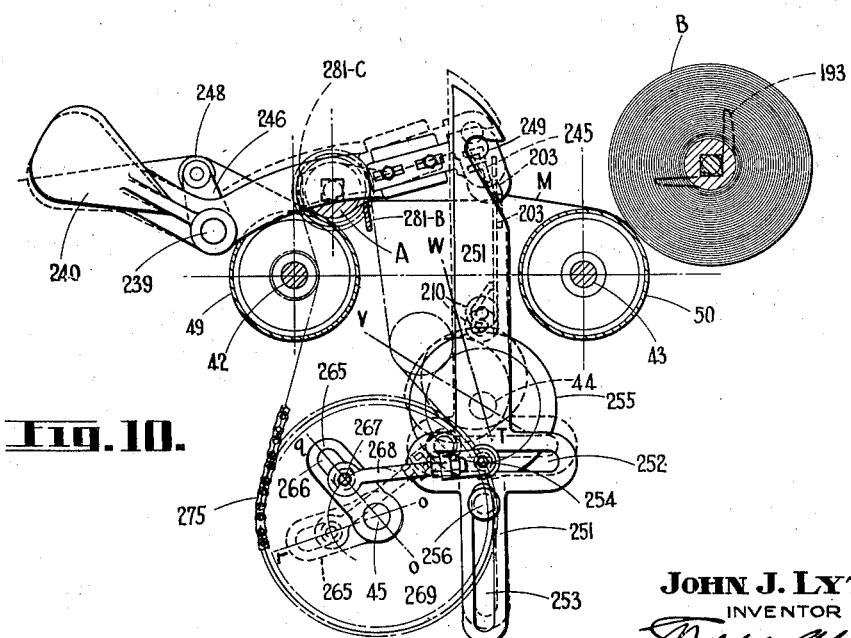

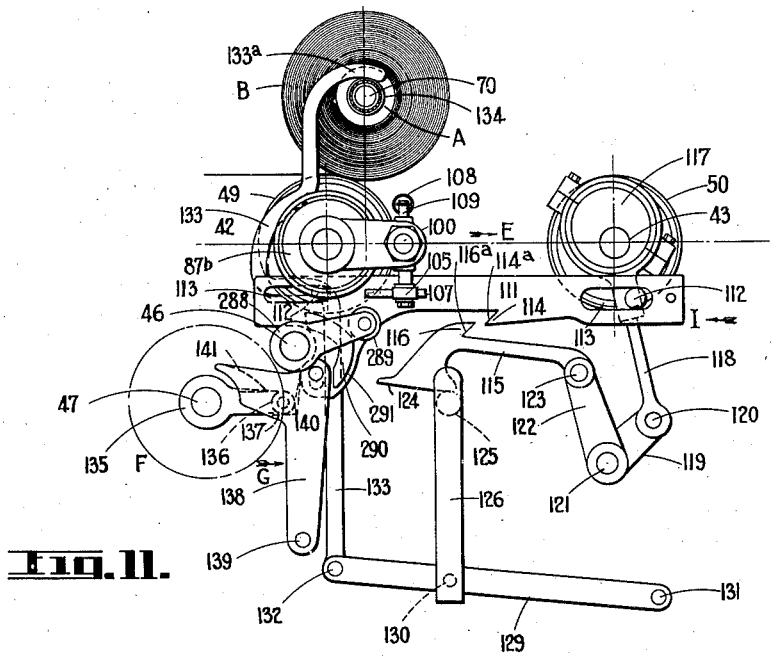

Nov. 6, 1934.    J. J. LYTH    1,979,334
MACHINE FOR WINDING MATERIAL OF RIBBON LIKE FORM INTO ROLLS
Filed Feb. 20, 1931    11 Sheets-Sheet 11
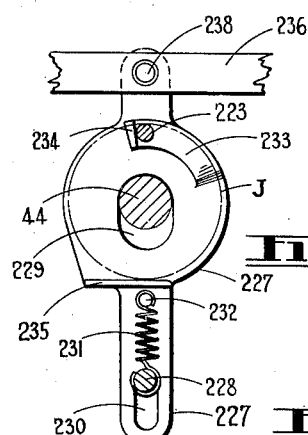
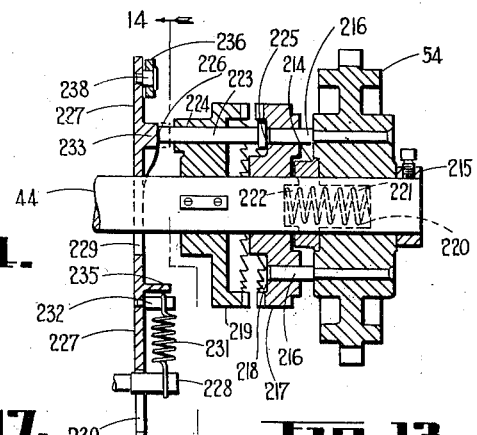
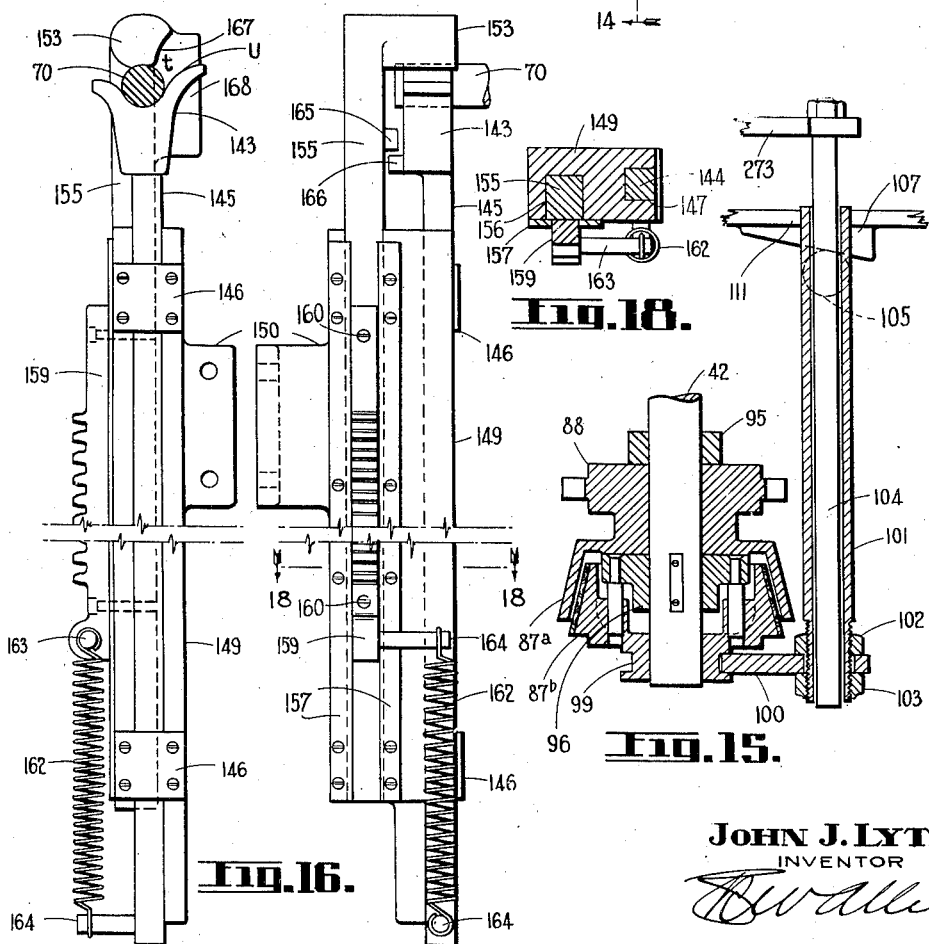
JOHN J. LYTH.
INVENTOR
ATTORNEY Patented Nov. 6, 1934

1,979,334

UNITED STATES PATENT OFFICE

1,979,334
MACHINE FOR WINDING MATERIAL OF RIBBON LIKE FORM INTO ROLLS

John J. Lyth, Valleyfield, Quebec, Canada

Application February 20, 1931, Serial No. 517,239

73 Claims. (Cl. 242—65)

My present invention relates in general to improvements in machines for winding material of ribbon like form, such as cloth, paper and the like, into rolls.

Broadly, the invention consists essentially of the novel design characteristics defined in generic and specific terminology in the claims for novelty following a comprehensive analysis of one form of the invention as reduced to practice.

While there is no intention of restricting the present invention to the textile manufacturing industry, the embodiment disclosed is particularly adapted to batch or bolt cloth delivered from a stentering machine, and comprises means to wind the material in transit into rolls, means to discharge the rolls of material thus wound from said winding means, means to subsequently sever the material from the discharged rolls, and means to subsequently effect uniform winding of the free ends of the severed material in transit into rolls by said winding means.

According to the textile manufacturing art, material to be batched, bolted or wound into rolls is delivered from a stentering machine at a lineal speed in some instances exceeding 100 yards per minute, to a winding and cutting machine, where the material is wound into rolls of manually selective yardage. Winding machines in general use are improvised and inadequate in that considerable difficulty is experienced by the machine operators in maintaining transverse relation of the rolls of material with respect to the material in transit, during the operations of manually shifting the rolls of material in process of winding from one winding roll to another prior to the material severing operation, which, due to the high speed at which the material is travelling, frequently results in wrinkling of the material and inherent loss thereof. The material cutting or severing means now used on machines of this character militate against the general efficiency of the machines, due to the fact that the material is advanced over an angularly disposed severing knife of the serrated tooth type under tractile effort frictionally imparted to the roll of material in process of winding by one of the material winding rolls, and when said knife is shifted so that the material in transit thereabove is impaled, if the material is heavy and does not cut easily, the knife instead of severing the material, merely holds up the material in transit, since the material is advanced under tractile effort resulting only from frictional contact of the roll of material in process of winding with one material winding roll of the machine. Furthermore, due to the high lineal speed at which the cloth is delivered from the stentering machine, it is very difficult for the machine operators to uniformly wrap the free end of the material, following each severing operation, about the empty roll shell, which further results in excessive wrinkling and spoiling of the material.

My present invention resides in the provision of a machine of the character described in which the material roll transfer, empty material roll shell replacement and material severing and rewinding operations are performed mechanically, subject to manual control, substantially independent of the operator's skill, with the result that the material is uniformly wound up and cut into rolls substantially without wastage.

Cognizant of the foregoing, I contemplate within the purview of my invention the provision of a material winding and cutting machine including combinatively, means to wind material on a roll shell in initial and subsecutive positions; transfer means to shift a roll of material in process of winding from the initial material winding position to the subsecutive material winding position and transfer an empty roll shell to the position occupied by said roll of material prior to its transfer; drive means to actuate said transfer means; automatic timing means coacting with and responsive to movement of the roll shell disposed within the roll of material in process of winding for interconnecting said transfer means with said transfer means actuating means; manually operable means to control said drive means independently of said automatic timing means; means to sever the material in transit in close proximity to the said empty shell disposed in the initial material winding position; automatic means coordinated in timed relation with the said material severing means to wrap the free end of infeeding material about the said empty roll shell, immediately upon completion of the material cutting operation, and manually operable control means for the said material severing and wrapping means.

While the invention in its entirety and preferred embodiment includes the combined means above mentioned, I wish it to be understood that I consider the aforesaid means not only combinatively novel but, in so far as I have been advised, certain of the coordinated mechanisms embodied in such means are new in less combinations than the whole and are capable of individual use, as will more clearly appear hereinafter.

A specific object of my invention is to provide a machine of the class described embodying transfer means to shift a roll of material in process of winding from a primary winding roll to a secondary winding roll, at a speed corresponding substantially with the lineal velocity of and in right angular relation with the material in transit, whereby the material is not perceptibly stretched, slackened or wrinkled. The transfer means referred to is further characterized in that, during its return motion, it picks up an empty roll shell and places the same in the initial material winding position.

A further specific object of my invention resides in the provision of means to support an empty material roll shell shifted by said transfer means to the initial material winding position, just clear of the material in transit, and manually operable means to lower said roll shell into peripheral contact with the material in transit immediately prior to the material severing operation and in readiness for commencement of a rewinding operation.

Another specific object of my invention is to provide powered actuating means for said transfer means; automatic timing means coacting with and responsive to movement of the roll shell disposed within the roll of material in initial material winding position for interconnecting said powered actuating means with said transfer means; and automatic means to disengage said transfer means from said means for actuating said transfer means, following each material roll and empty roll shell transfer operation.

The invention is further characterized in that manually operable control means are provided to interconnect said transfer means with the powered actuating means therefor, whereby said transfer means may be caused to function independently of said automatic control means.

Additional novel characteristics of my invention reside in the provision of means, subject to manual control, for severing the material in transit without excessive laceration of the material or impediment of its travel, coordinated with automatic means for smoothly and uniformly wrapping one free end of the material, immediately upon completion of each material severing operation, about the empty roll shell disposed in the initial material winding position, to repeat the material winding operation.

Novel aspects, objects and advantages of the invention, in addition to the foregoing, may be ascertained from the following specification and claims, read in conjunction with the annexed drawings illustrating one embodiment of the invention, in which:—

Fig. 1 is a side elevation of the machine, with parts broken away to facilitate disclosure of the drive mechanism.

Fig. 2 is an end elevation thereof, as it appears when viewed from the right end of Fig. 1.

Fig. 3 is an elevation of that side of the machine opposite the side illustrated in Fig. 1.

Fig. 4 is a partial plan view of the machine, a portion thereof intermediate the laterally disposed operating mechanisms being omitted to enable disclosure of the complete operating mechanisms in a single plan view.

Fig. 6 is a longitudinal vertical sectional elevation, in diagrammatic form, of part of the transfer mechanism per se, showing the relation of the same with respect to the material winding rolls and the material roll and the means to support an empty roll shell in readiness for transfer to the initial winding position.

Fig. 7 is a view similar to Fig. 6, showing the transfer mechanism in advanced position.

Fig. 8 is a view corresponding to Figs. 6 and 7, disclosing the transfer mechanism in further advanced and retrogressive positions.

Fig. 9 is a longitudinal vertical sectional elevation, in diagrammatic form, disclosing the cloth severing and wrapping means; actuating and control means therefor; and the relation of the aforesaid means with respect to the material winding rolls.

Fig. 10 is a view similar to Fig. 9 showing certain of the components in relative operating positions.

Fig. 11 is a side elevation illustrating the transfer mechanism automatic timing means per se in idling position.

Fig. 12 is a view corresponding to Fig. 11, showing the transfer mechanism automatic timing means in one position occupied thereby during shifting of the transfer mechanism.

Fig. 13 is a vertical section taken on the plane represented by the line 13—13 on Fig. 4, of the claw type clutch and control means therefor used on the intermittent motion transmitting shaft of the machine.

Fig. 14 is a sectional elevation of the claw clutch control device, the view being taken on a plane represented by the line 14—14 on Fig. 13.

Fig. 15 is a horizontal sectional view on the plane represented by the line 15—15, through the friction cone clutch used in the transfer mechanism drive.

Figs. 16 and 17 are side and end elevations respectively of the means to support a material roll shell in the initial material winding position.

Fig. 18 is a horizontal section taken on the line 18—18 on Fig. 17.

Figure 5:
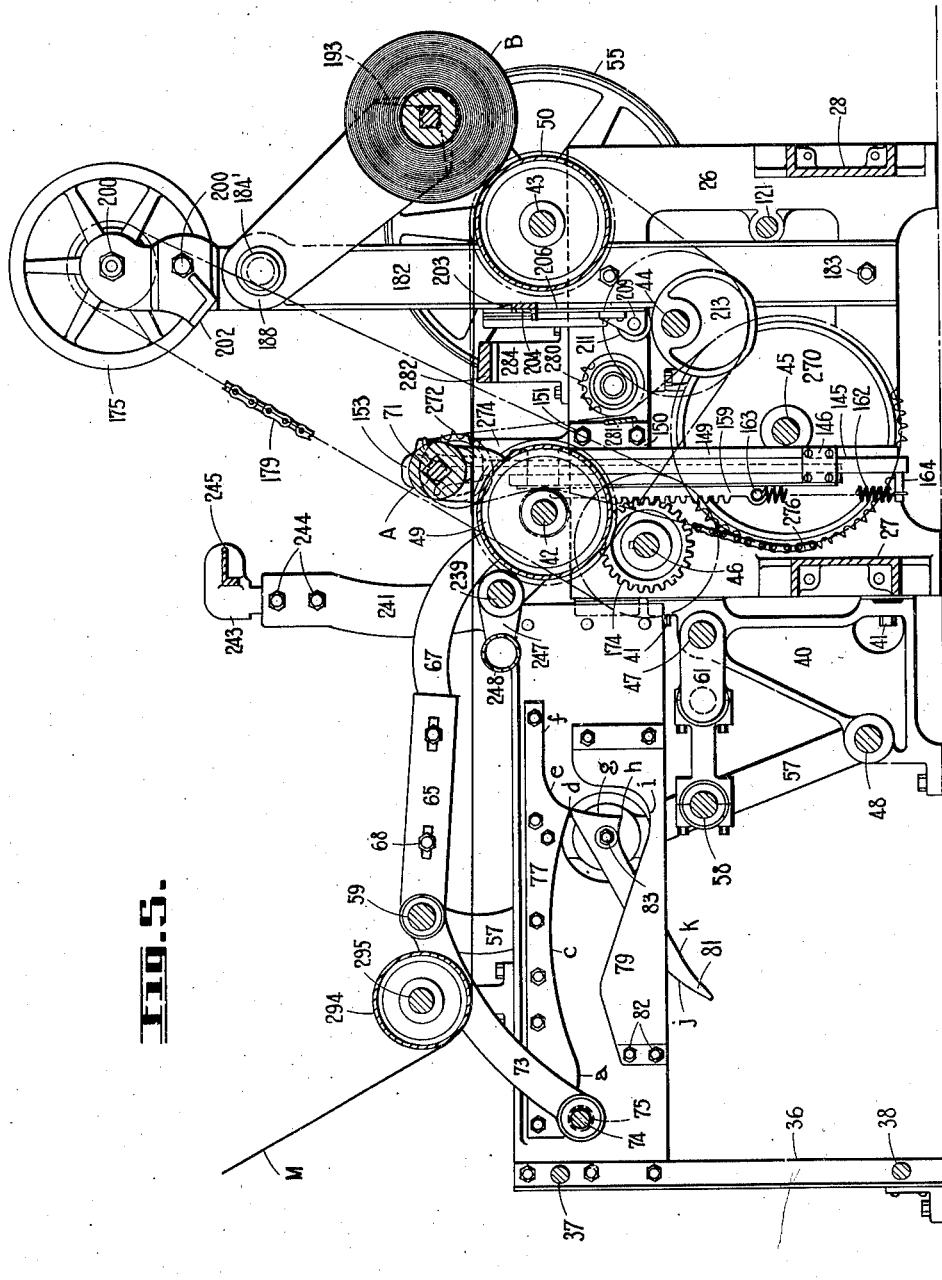
Fig. 5 is a longitudinal vertical section of the machine as it appears when viewed from the plane designated by the line 5—5 on Fig. 4.

Figs. 13 to 18 inclusive are drawn at a scale of substantially double size with respect to the preceding figures.

In the following detailed description of that embodiment of the invention illustrated in the drawings, the various mechanisms comprising the complete structure will be described, for convenience of reference, under distinguishing captions.

*Machine frame construction*

The machine base and frame comprise the two side frame castings 25 and 26, which are supported in spaced relation by the spacing members 27 and 28, secured thereto by the cap screws 29. Two cam track structure frame plates 30 and 31 are fastened to extensions 32 on the aforesaid frame castings by means of brackets 33 and cap screws 34. The rear ends of said frame plates are supported by the legs 35 and 36, which are held in spaced relation by the rods 37 and 38. Two shaft journal brackets 39 and 40 are secured to the ends of the frame castings 25 and 26 by means of the cap screws 41.

A plurality of shafts extend transversely of said machine base and frame and are journalled in suitable bearings mounted thereon or formed therein, and consist of the winding roll shafts 42 and 43; the intermittent motion transmitting shaft 44; the material wrapping bar sprocket drive shaft 45; the material roll shell supporting member adjusting shaft 46; the transfer mechanism crankshaft 47; and the transfer mechanism actuating arm supporting shaft 48.

Material winding rolls

Primary and secondary material winding rolls 49 and 50 of corresponding external diameter are mounted on the shafts 42 and 43 respectively and are driven at uniform peripheral velocity by means of the drive chain 51 trained over the sprockets 52 and 53, which are of equal pitch diameter and are fixed to shafts 43 and 42 respectively, and over the clutch sprocket 54 rotatably mounted on shaft 44. The shaft 43 is provided with a belt pulley 55 for drive purposes and exemplifies one suitable form for delivering power to the machine.

Material roll transfer means

The material to be bolted or wound into rolls, hereinafter generally indicated by the reference character M, is primarily wound up on a roll shell A supported above the primary winding roll 49 with the material being wound thereabout in peripheral contact with the said primary winding roll and, when the roll of material thus wound increases to a predetermined diameter, the same is picked up and advanced to a subsecutive winding position in peripheral contact with the said secondary material winding roll 50, and the material winding operation is subsequently continued until the roll of material, indicated at B and thus wound is severed from the material M in transit. The transfer mechanism employed to intermittently and successively shift the rolls of material in process of winding from the initial to the subsecutive material winding position referred to, consists of two oscillatable actuating arms 56 and 57 fixed on the revoluble shaft 48. These actuating arms 56 and 57 are transversely interconnected intermediate their ends by the shaft 58 and at the upper ends thereof by the shaft 59, both said shafts being fixed to the arms. The transfer mechanism crankshaft 47 embodies two crank throws 60 and 61, which are interconnected by means of the two connecting rods 62 and 63 to said shaft 58. The said crankshaft is employed to oscillate said actuating arms 56 and 57 and is powered by the drive mechanism presently referred to.

Horizontally and vertically adjustable material roll transfer elements generally indicated by the numerals 64 and 65 are articulated with respect to said actuating arms 56 and 57 on the shaft 59. These transfer elements include adjustable material roll shell engaging extensions 66 and 67, which are secured to the associated sections of the transfer elements generally indicated at 64 and 65, by means of bolts 68. The material roll shell engaging extensions 66 and 67 terminate in the form of saddles 69, which are designed to engage the round extremities or trunnions 70 of the material roll shell core bars 71. The rear extremities 72 and 73 of said transfer elements extend downwardly and are transversely interconnected by shaft 74 fixed thereto. An antifriction type roller, indicated at 75, is mounted on each end of shaft 74.

Material roll shell engaging and releasing motions, upon progressive and retrogressive movements of the said transfer elements, are effected by means of a stationary cam track structure over which the aforesaid rollers 75 travel. This cam track structure is in duplicate, being mounted in transverse alignment on the inner opposed faces of the frame plates 30 and 31, and in general comprises the upper cam tracks 76 and 77, the guides 78 and 79 and the detents 80 and 81. The cam tracks 76 and 77 and the guides 78 and 79 are stationary, being secured to the frame plates 30 and 31 by the bolts 82. The detents 80 and 81 are pivoted at 83 on the vertically adjustable brackets 84 and 85, which are secured to said frame plates by bolts 86.

The motion imparting surface of each aforesaid cam track is in the form of an arcuate ridge $a$ in close proximity to the rear extremity $b$ thereof; the slightly concave track portion $c$ terminating in the apex $d$; the sharp upwardly receding concave surface $e$ and the plane surface $f$. The detents 80 and 81 have end surfaces $g$ which, when the detents are in the position shown in Figs. 1, 3, 5, 6, 7 and 8, are flush with the apexes $d$ and surfaces $e$. The shoulders $h$ of the detents 80 and 81 with respect to the pivotal axes thereof and the curved portions $i$ of the guides 78 and 79, are such as to permit the rollers 75 to pass under said shoulders. The detents 80 and 81 are so designed that the extremities $j$ thereof bear against the concave surfaces $c$ of the cam tracks 76 and 77 during retrogressive movements of said transfer elements, as subsequently clearly set forth. The guides 78 and 79 are employed to limit movement of the rear extremities 72 and 73 of the transfer elements 64 and 65. These guides are arranged inwardly of the cam tracks 76 and 77 and the detents 80 and 81 are disposed directly beneath the said cam tracks.

Drive and control means for material roll transfer means

Power to actuate the material roll transfer mechanism referred to is transmitted from the normally continuously rotating shaft 42 to the crankshaft 47, through the friction cone clutch generally indicated at 87, and a suitable speed reduction gear train embodying the sprocket 88, the drive chain 89, the sprocket 90, the pinion 91, the spur gear 92 and the elliptical gears 93 and 94. The said friction cone clutch is clearly shown in Fig. 15 and includes the section 87$^a$ which is free to rotate on shaft 42 and is retained between the collars 95 and 96. The sprocket 88 is integral with this section of the clutch. The associated clutch section 87$^b$ rotates with the shaft 42 and is adjustable with respect to the aforesaid clutch section, according to conventional clutch design practice. Shifting of section 87$^b$ of the clutch is effected and controlled by automatic timing means presently described. The pinion 91 is fixed to rotate with the sprocket 90 and the spur gear 92, driven by the said pinion, is connected to the elliptical gear 93. Elliptical gear 94, meshing with and driven by the elliptical gear 93, is fixed to the crankshaft 47. This gear train is designed to provide substantially uniform progressive transfer mechanism movement, whereby rolls of material are successively transferred from the primary winding roll 49 to the secondary winding roll 50 at a velocity corresponding substantially with the lineal speed of the material in transit, so that the material is neither noticeably stretched or slackened during such operations. To provide the aforesaid uniform transfer speed, the disposition of these elliptical gears is such that the major axes thereof lie in planes substantially as shown in Fig. 1. The stationary shaft 97, upon which the spur gear 92 and the elliptical gear 94 are rotatably mounted, extends through bracket 39, and is secured thereto by nut 98, shown in Figure 4.

Section 87$^b$ of the clutch 87 is provided with an annularly grooved extension or hub 99. The arm 100, which extends from sleeve 101 and is secured thereto by nuts 102 and 103, fits into and embraces said grooved extension 99. Sleeve 101 is supported by the stationary rod 104 and carries an anti-friction type roller 105 mounted by means of the pin 106. The roller 105 is constrained against cam 107 by the retractile coil spring 108, which is connected at one end to pin 109 on sleeve 101 and at the other end thereof to the stationary pin 110 mounted on part of the machine frame later referred to.

Cam 107 constitutes part of the clutch control mechanism, which is timed by feeler mechanism, to effect progressive movement of the material roll transfer mechanism, and during retrogressive movement of the latter, means controlled thereby act on the aforesaid clutch control mechanism and determine such retrogressive movement. Cam 107 is mounted on or is integral with the clutch control element 111, which is supported by the stationary pins 112 extending through elongated apertures 113 formed therein. A single tooth 114 extends from the lower edge of the clutch control element 111, and is provided with an inclined face 114ª.

The feeler mechanism referred to includes a feeler 115 provided with a single tooth 116 having an inclined face 116ª, which tooth is designed to engage the tooth 114 on the clutch control element 111, to shift the said element. Feeler 115 is powered by the shaft 43 through the eccentric 117 mounted on the said shaft and the eccentric rod 118 mounted on the said eccentric, which eccentric rod is connected to the lever 119 at 120. Lever 119 is stationary on the shaft 121. The shaft 121 is journalled in the two side frame castings 25—26, and carries the lever 122 to which the said feeler 115 is pivoted at 123.

The plane face 124 of feeler 115 rides upon the roller 125 mounted on the vertically adjustable carrier 126, which is supported by the guide casting 127 secured to the frame casting 25 by cap screws 128. See Fig. 1. This carrier, best shown in Fig. 2, extends under the frame casting 25 and is hinged to the motion transmitting lever 129 at 130. The motion transmitting lever 129 is pivoted on the pin 131 extending from the frame casting 25 and is pivoted at its opposite end, as indicated by the numeral 132, to the timing trigger 133. This timing trigger is of irregular formation to clear shafts 42 and 46 and is provided with a curved upper end 133ª which extends over and at intervals bears upon the anti-friction rollers 134 mounted on the trunnion 70 of each material roll shell core bar 71. The timing trigger 133 serves to elevate feeler 115 incidental to perpendicular movement of the roller 134 on the roll shell A disposed within the roll of material B in process of winding, until the tooth 116 on the continuously reciprocating feeler 115 engages the tooth 114 on the clutch control element 111 and effects rectilineal displacement of the said clutch control element 111 in the direction indicated by the arrow E, thus carrying the cam 107 laterally from behind the roller 105. The section 87ᵇ of the clutch 87 is then forced under retractile tension of the spring 108 into engagement with the section 87ª of the said clutch 87, whereby power applied to the shaft 42 is transmitted, through the speed reduction gear train described, to the crank shaft 47.

Crank shaft 47 is stopped after each respective complete revolution thereof to reset the transfer mechanism described and in particular to return the material roll transfer elements 64 and 65 to the position shown in Figs. 1, 3 and 6. The means to thus control rotation of said crankshaft consists of an arm 135 mounted thereon and provided with a roller 136. This roller travels in a path at equal radial distances from the axis of said crankshaft, as indicated by the broken line circle F' in Figs. 11 and 12. The lower face of the outer end of the arm 135 is flat and bears against a shoulder 137 on trip arm 138, when the transfer mechanism previously described is in the position shown, for instance, in Figs. 1 and 11. The trip arm 138 is pivoted at 139 to the frame casting 25 and is articulated at 140 to the clutch control element 111. This trip arm 138 is provided with an arcuate cam surface 141 laterally offset with respect to the shoulder 137. The cam surface 141 terminates at 141ª, leaving a space 142ª below the same, through which space the roller 136 may pass when the said trip arm 138 is shifted laterally, in the direction of arrow G, to the position shown in Fig. 12, with the clutch control element 111. Attention is directed to the fact that in this position the upper extremity of cam surface 141 remains within the path of travel of roller 136, as indicated by broken line circle F, so that upon continued rotation of crankshaft 47, the arm 135 and roller 136 swing around and said roller abuts the upper extremity of said cam surface, in consequence of which the trip arm 138 is forced to swing back, in the direction indicated by arrow H, to the position shown in Fig. 11. Since the clutch control element 111 is articulated to said trip arm, lateral movement of the latter in the direction of the arrow H forces the said clutch control element to shift in the direction indicated by the arrow I back to the position depicted in Fig. 11. During such movement, the cam 107, against which the roller 105 bears, forces the said roller and the sleeve 101 to which it is secured to shift and disengage the section 87ᵇ of the clutch 87 from section 87ª thereof, thus cutting off power to the speed reduction gear train described.

*Material roll and empty roll shell supporting* *means*

The transfer mechanism described is utilized to intermittently and successively shift rolls of material from the initial material winding position in contact with the primary winding roll 49, clearly shown in Figs. 6 and 7, to the subsecutive winding position in contact with the secondary winding roll 50 best shown in Figs. 1, 3, 5 and 8. The means to support the empty roll shells A and the rolls of material B in process of winding will now be described. As best shown in Figs. 5, 16, 17 and 18, the empty roll shells A, and subsequently the rolls of material B in process of winding, are supported above or in contact with said primary winding roll 49 upon the saddles 142 and 143 mounted upon the upper ends of the vertically adjustable bars 144 and 145, which are retained by the plates 146 within the vertical channels 147 in the castings 148 and 149. These castings are each provided with a lug extension 150, through which bolts 151 extend and serve to secure said castings 148 and 149 to the frame castings 25 and 26 respectively.

Means are provided to retain the trunnions 70 of the roll shells A in the saddles 142 and 143 and comprise the holding members 152 and 153 integral with the vertically adjustable bars 154 and 155, which are slidably mounted within the vertical channels 156 formed in the castings 148 and 149. These bars 154 and 155 are retained in said channels 156 by plates 157, and have racks 158 and 159 secured thereto by the cap screws 160. The saddles 142 and 143, and the holding members 152 and 153, are tensioned to securely hold the trunnions 70 of the roll shells A in said saddles, by retractile coil springs 161 and 162 connected at their upper ends to pins 163 extending from racks 158 and 159 and at their lower ends to the pins 164 extending from the saddle carrying bars 144 and 145. Movement of the saddles 142 and 143 and the holding members 152 and 153 towards one another is limited by the lugs 165 and 166 integral with said members. The holding members 152 and 153 are provided with concave faces 167 against which the trunnions 70 of the roll shells A abut during successive transfer of roll shells A to the said supporting means. The roll shells A are axially directed into the supporting means described by the inclined lugs 168 integral with or supported by the said holding member bars 154 and 155.

Since the bars 144 and 145, and 154 and 155, are slidably mounted with respect to said castings 148 and 149, the said roll shell supporting means shift vertically during increase in diameter of the roll of material B in process of winding by the primary winding roll 49. After a roll of material B is released from said supporting means, the said roll supporting means, due to gravitational action, descend and are arrested in their downward movement upon reaching the proper position to receive an empty roll shell A from the transfer mechanism described, by the stop member 169 fixed to the shaft 46, the shoulder 170 of which abuts the foot lever 171, which is pivoted on the frame casting 26 at 172. The means described serves to control rotation of shaft 46, which has spur gears 173 and 174 keyed thereto and which mesh with the racks 158 and 159. It will be seen in Figs. 3 and 5 that the relation of the stop member 169 in relation to the spur gears 173 and 174 with respect to racks 158 and 159, and the co-relation of the said components with respect to the previously described structure of the material roll supporting means, is such that the empty roll shell A, clearly shown in Fig. 5, is supported clear of and in close proximity to the material M in transmit over the primary winding roll 49, so that during continued winding of the material M on the roll of material B in winding contact with the secondary winding roll 50, the said roll shell A is supported clear of the material M in transit, thereby relieving the material M in transit of unnecessary frictional contact.

Manually operable means are provided to enable the machine operator to easily elevate an empty roll shell, held in contact with the primary winding roll 49, from said roll, should it be discovered that a defective empty roll shell has been transferred to the initial material winding position. The means provided for this purpose comprise the hand wheel 175 mounted on pin 176. A sprocket 177 is connected to said hand wheel. Another sprocket 178 is fixed to shaft 46 in alignment with the aforesaid sprocket 177 and the chain 179 is trained over said sprockets. Spur gears 173 and 174 are keyed to shaft 46 and mesh with racks 158 and 159 on the material roll shell supporting means previously described. It is apparent that rotation of the hand wheel 175 results in rotation of the shaft 46, motion being transmitted through the sprocket 177, chain 179, and sprocket 178. Since the spur gears 173 and 174 are fixed to the shaft 46, rotation of said shaft, through the said spur gears and the racks 158 and 159, will effect perpendicular displacement of the holding members 152 and 153, whereby the roll shell retained thereby may be manually removed from the machine.

Pin 176 is secured by the nut 180 to the standard 182 of the pair of transversely opposed standards 181 and 182, which are secured to the frame castings 25 and 26 respectively by the bolts 183.

Pins 184 and 184' serve as pintles or axles upon which the material roll supporting arms, generally indicated at 187 and 188, hinge or pivot. These pins are secured in position by the shouldered collars 185 and 186 and the nuts 186. The arms 187 and 188 are each made of two castings, the outer sections 189 and 190 thereof being fixed to the inner said sections by rivets 191 or the equivalent. The lower ends of arms 187 and 188 are provided with integral transversely opposed flanges which constitute saddles, indicated at 192 and 193, and serve to support the trunnions 70 of the rolls of material B in winding contact with the secondary winding roll 50. The arms 187 and 188 are provided with handles 194 for the convenience of the machine operators in releasing a roll of material B from the arm saddles 192 and 193.

A series of empty roll shells A are supplied by the machine operator one at a time to the machine and are successively supported at a higher elevation than the material winding rolls 49 and 50, between standards 181 and 182, in the horizontally adjustable brackets 195 and 196, which are embraced by the vertically adjustable shoes 197 and 198, and are secured to said standards by bolts 199 and 200. The brackets 195 and 196 are provided with inwardly extending, transversely opposed integral flanges, which provide saddles 201 and 202 for the purpose of supporting the trunnions 70 of the empty roll shells A.

*Material severing means*

Material M in transit is severed by the severing knife 203, fixed to the angle bar 204 and to the guide plates 205 and 206, which are vertically guided in the channels 207 and 208 milled in the standards 181 and 182. The cutting edge of the knife is preferably of the saw tooth type with the cutting edges on one side of the blade only. Brackets 209 are secured to the guide plates 205 and 206 and support the rollers 210 and 211, which ride on the cams 212 and 213 keyed to the shaft 44. Upon rotation of the said shaft, the said cams effect perpendicular displacement of the said rollers 210 and 211, and the material severing knife 203.

Shaft 44 is driven by the chain 51 trained over the sprockets 52, 53 and 54. The sprocket 54 is free to rotate on the shaft 44 between the collars 214 and 215 secured to the said shaft. See Fig. 13. Sprocket 54 carries two guide pins 216 in parallel relation with respect to the shaft 44 and the movable section 217 of the claw clutch is supported by the said pins which extend through reamed holes 218 therein, the internal diameter of which, in relation to the external diameter of said pins 216, provides a free sliding fit. Section 219 of the claw clutch is keyed to the shaft 44. The section 217 of the said clutch is urged towards section 219 thereof by means of the two coil springs 220, which are supported in apertures 221 in the sprocket 54, and seat in opposed apertures 222 in the clutch section 217. Sections 217 and 219 of said clutch are normally held in spaced relation by the control pin 223, which extends through a reamed hole 224 in the clutch section 219, and has a flat end 225 against which the clutch section 217 is urged by the coil springs 220. The opposite end 226 of the control pin 223 bears against the clutch control member, generally indicated at 227. This clutch control member 227 is supported by the shaft 44 and a pin 228 extending from a lug, not shown, integral with the standard 182. The apertures 229 and 230 through which the said shaft and pin extend are elongated to permit vertical movement of the member 227, which is normally tensioned downwardly and retained in the position shown in Figs. 13 and 14, by the retractile coil spring 231, which is connected to the said pin 228 and to a pin 232 mounted on member 227. An arcuate cam 233 is provided on the member 227 to effect horizontal displacement of the clutch control pin 223, and terminates in the form of a lug 234 which forms an abutment or stop for the pin 223, and by such means rotation of shaft 44 is terminated following each respective material severing operation.

A lug 235 extends at right angles from the member 227 and is so located with respect to the axis of the shaft 44, when the member 227 is in the position shown in Fig. 14, that an imaginary circle J, depicted in broken line form, and centered in the axis of shaft 44 and tangent to the periphery of pin 223, is also tangent with respect to said lug. The clutch control member 227 is shifted manually, the control lever 236 hinged to the frame casting 26 at 237, and articulated at 238 to said member 227, being provided for this purpose. Power is applied to the shaft 44 from the shaft 43 through the chain drive described upon upward movement by the machine operator of the free end of the control lever 236, which in turn lifts the member 227, whereby the cam 233 is shifted upwardly from the pin 223. Since the support for the said pin is thus removed, coil springs 220 force section 217 of the claw clutch into engagement with the other section 219 thereof, thereby coupling the sprocket 54 through the clutch means described to the shaft 44. If the operator, after engagement of the said clutch, promptly releases the control lever 236, the spring 231 draws the member 237 downwardly to the position depicted in Fig. 14 and, upon continued turning of the shaft 44, the pin 223 rides up on cam 233 and is displaced horizontally thereby, which action in turn pushes section 217 of the claw clutch away from and clear of section 219 thereof, to the position shown in Fig. 13, and rotation of the shaft 44 is terminated upon abutment of pin 223 against lug 234 on the member 227. If the machine operator fails to quickly release the control lever 236 after effecting engagement of the said claw clutch, upon rotation of the shaft 44, the end 226 of the pin 223 strikes the lug 235 extending from the member 227 and forces the same down to the position shown in Fig. 14, that is, to the position to which the spring 231 would otherwise return said member.

The means to support said material in transit transversely thereof and in close proximity to the severing knife may be in the form of a shaft 239 journalled in extensions from or parts supported by the frame castings 25 and 26. Counterweighted arms 240 and 241 are fixed to the ends of the said shaft. These arms support adjustable extensions 242 and 243 secured thereto by the bolts 244. A material supporting bar 245 is fixed intermediate said arm extensions. Arms 246 and 247 are mounted on the shaft 239 intermediate the arms 240 and 241 and support a material engaging roller 248 therebetween. A pin 249 projects from the arm extension 242.

Immediately prior to the material severing operation, the arms 240 and 241 are tilted forwardly by the machine operator and the pin 249 is engaged in a recess 250 formed in the link 251, which actuates said material engaging bar 245. These components are clearly shown in such engaged position in dotted lines in Fig. 9. Link 251 is provided with a transverse slot 252 and a slot 253 at right angles to the aforesaid slot. A pin 254 extends from the disc 255 through the slot 252 in the link 251. The disc 255 is stationary on the shaft 44 and is contiguous with the said link. The link 251 is also supported by the pin 256 extending from the boss 257 integral with frame casting 25, and by the bracket 258 shown in Fig. 1, extending from frame casting 25. This bracket is provided with a slot 259 in which the said link is constrained. The said link is free to swing laterally only, to the left of the position in which it is shown in Fig. 1. The link 251 is normally constrained in the perpendicular position shown in Fig. 1, by the weight 260 on the end of the chain 261 trained over the roller 262 and connected to the hook member 263. This hook member is bifurcated and straddles the bracket 258, with the ends 264 thereof embracing the link 251.

An arm 265 is keyed to the end of the shaft 45, and is provided with a slot 266 in which the pin 267, extending from the connecting arm 268, is engaged. The other end of the connecting arm 268 is connected to the pin 254 aforesaid. This link mechanism is designed to impart limited rocking motion to the shaft 45, to operate the material wrapping mechanism presently described.

As the shaft 44 rotates, the disc 255 is turned in the direction indicated by the arrow K in Fig. 9, and the pin 254 extending through the slot 252 in the link 251 lowers the said link, and the interconnected arms 240 and 241, and the material supporting bar 245, are lowered so that the bar 245 bears against the material M transversely thereof in close proximity to and parallel with respect to the severing knife 203, which is simultaneously shifted upwardly, by the knife actuating means described, to sever the material M.

Immediately after the material severing operation, the free end of the severed material, that is to say, the end of the material being fed between the primary winding roll 49 and the empty roll shell A thereabove, is picked up and wrapped about the said empty roll shell, so that the material winding operation is repeated. Such wrapping means may be in the form of two sprockets 269 and 270, fixed in spaced relation on the shaft 45, and two aligned sprockets 271 and 272 free to rotate on the stub shafts or pins, not shown, supported by perpendicular standards 273 and 274 secured to the frame castings 25 and 26 by the bolts 151, which are also employed to secure castings 148 and 149 in fixed position on the machine frame.

Chains 275 and 276 are trained over the sprockets 269 and 271 and 270 and 272 respectively, and are supported by the idler sprockets 277 and 278 free to rotate on shaft 42, and by the idler sprockets 279 and 280 supported by the frame castings 25 and 26. The material wrapping bar 281 is suitably linked to said chains 275 and 276 in parallel relation with respect to the primary winding roll 49 and the empty roll shell A supported thereabove. The pitch diameter of the sprockets 271 and 272 and the co-relation of the wrapping bar 281 with respect to the chains 275 and 276 is such that when the said wrapping bar is advanced partially circumferentially about an empty roll shell A, it just clears the periphery thereof.

A bar 282, mounted on standards 283 and 284 and supported by frame castings 25 and 26, serves as a transverse support for the material M to facilitate shearing of the material by hand, when necessary.

I contemplate utilizing means to lock the transfer mechanism previously described, whereby the roll of material B in process of winding must reach a predetermined diameter before the same may be transferred from the primary winding roll 49 to the secondary winding roll 50, incidental to manipulation of the manually operable control means, which consists of a control lever 285 pivoted on the frame casting 25 at 286 and connected to the clutch control element 111 by the pin 287. To accomplish the foregoing, an arm 288 is mounted on the end of the shaft 46 and carries a roller 289 on its outer end, which rides on the cam, generally indicated at 290 integral with or mounted on the clutch control element 111. This cam is provided with two arcuate surfaces 291 and 292 which diverge from the cam apex 293. The arcuate cam surface 292 is formed at equal radial distances from the axis of the shaft 46, whereby, when the roller 289 bears against any point on the said cam surface between the cam apex 293 and the other extremity thereof, and pulling force is applied to the lever 285 by the machine operator, such force is directed to the axis of the shaft 46, so that the clutch control element is held against movement. When the roll of material B in process of winding by the primary winding roll 49, as shown in Fig. 11, has grown to a predetermined diameter, the shaft 46 has been turned so that the roller 289 has rolled off the cam surface 291, over the cam apex 293, on to the cam surface 292, the contour of which is such that, when the clutch control element 111 is shifted in the direction indicated by the arrow E, Fig. 12, the arm 288 is elevated to the position shown in Fig. 12, which in turn has effected rotation of the shaft 46, and resultant elevation of the roll shell holding members 152 and 153 through the spur gears 173 and 174 and racks 158 and 159 mounted on the bars 154 and 155 which carry the said holding members. In this position, the holding members 152 and 153 are elevated clear of the roll shell trunnions 70 and the material roll transfer operation may be effected at this time.

The material M being fed to the machine is guided by the idler roll 294 mounted on the shaft 295, which is journalled in bearings in the standards 296 and 297, which are bolted to the frame plates 30 and 31, as at 298.

General operation of the machine

The material M is delivered from a stentering machine or other source and advances under guide roller 294, to the roll of material B in process of winding by either the primary winding roll 49 or the secondary winding roll 50. The machine is so designed that when the material M in transit is being wound up by the secondary winding roll 50, said material clears both the primary winding roll 49 and the empty roll shell A disposed thereabove, so that such material is not unnecessarily subjected to wear through frictional contact with either of these components.

In starting the machine, the free end of the material M is fed by hand between the primary winding roll 49 and the rotating empty roll shell A in contact with the said primary winding roll, and is uniformly wrapped by hand about the said empty roll shell. The roll of material thus started and now in process of winding by the said primary winding roll, shown in Fig. 7, continues to roll or increase in diameter until the roller 134 on the roll shell trunnion 70, during perpendicular displacement of the said roll shell incidental to winding up of the material, contacts with the arcuate upper extremity 133ª of the timing trigger 133 and elevates the same to the point where, through motion transmitting lever 129 and the carrier 126, the tooth 116 on feeler 115 is elevated until the points of teeth 116 and 114 engage and the inclined surfaces 116ª and 114ª cause said teeth to interlock. Since the feeler 115 is constantly reciprocated, the clutch control element 111 is shifted from the position illustrated in Fig. 11, in the direction indicated by the arrow E, to the position shown in Fig. 12. As shown in Fig. 11, before the feeler 115 has reached the position or has elevated to the plane where it engages the clutch control element 111, the arm 288 has advanced the roller 289 over the apex 293 of the cam 290, thereby releasing the clutch control element 111 for subsequent horizontal displacement.

As the clutch control element 111 shifts in the direction of arrow E from the position occupied thereby, in Fig. 11, to the position depicted in Fig. 12, the roller 105 on the sleeve 101 rolls down the cam 107, under retractile tension of the spring 108, and section 87ᵇ of the clutch 87 is shifted into frictional engagement with section 87ª of the said clutch, whereby the drive sprocket 88 is coupled by the said clutch to the shaft 42. Drive sprocket 88, through the chain 89, drives the sprocket 90 to which the pinion 91 is fixed. Pinion 91 meshes with and drives the spur gear 92, free to rotate on the stationary shaft 97. The spur gear 92 is connected to the elliptical gear 93, which meshes with and drives the elliptical gear 94 stationary on crankshaft 47. Through the speed reduction gear train described, the crankshaft 47 is rotated at varying speed, whereby the interconnected material roll transfer elements 64 and 65 are advanced progressively at a velocity corresponding substantially with the lineal speed of the material M in transit, so that the material is not noticeably stretched or slackened.

Rotation of crankshaft 47 effects oscillation of the actuating arms 56 and 57 interconnected thereto, which in turn actuate the material roll transfer elements 64 and 65. As power is applied to the crankshaft 47 through the speed reduction gear train described, the crankshaft throws 60 and 61 swing upwardly, and the actuating arms 56 and 57 move forward from the normal position of rest indicated by the line N—O in Fig. 6, to the position indicated at N—P, in Fig. 7, which causes the rollers 75 to ride up on the ridges a of the cam tracks 76 and 77, whereby the roll shell engaging extremities of the transfer elements 66 and 67 are elevated and the trunnions 70 of the roll shell in the roll of material B in process of winding are seated in the saddles 69 of the said transfer elements.

Incidental to rectilineal displacement of the clutch control element 111, the arm 288 is turned upwardly by the cam 290 to the position shown in Fig. 12. The partial rotary movement thus imparted to the shaft 46, through the spur gears 173 and 174 and the racks 158 and 159, has caused the holding members 152 and 153 to elevate clear of the trunnions 70 of the roll shell in the roll of material B supported in the roll shell trunnion saddles 142 and 143, thus releasing the material roll shell trunnions for subsequent transfer movement.

The transfer elements upon continued progressive movement from the position shown in full lines in Fig. 7, pick up the roll of material B and carry the same over the secondary winding roll 50, to the position depicted in dotted lines in Fig. 7. In advancing to this position, the rollers 75 travelled over the concave track portions $c$ of the cam tracks 76 and 77 above the detents 80 and 81. When the rollers 75 bear upon the apexes $d$ of the cam tracks 76 and 77 and the actuating arms 56 and 57 have swung forward to the position indicated in dotted lines and by the centre line N—Q, the roll of material B is about to contact with the secondary winding roll 50. Continued progressive movement of the said actuating arms causes rollers 75 to ride up the concave surfaces $e$ of said cam tracks, as shown in full lines in Fig. 8, which in turn cause the material roll engaging extremities of the transfer elements 64 and 65 to lower away from the trunnions 70 of the material roll shell, which then rolls forward carrying the trunnions 70 into the saddles 192 and 193 on arms 187 and 188. The actuating arms 56 and 57 are shown in fully advanced position in full lines in Fig. 8.

During retrogressive movement of actuating arms 56 and 57 from the position indicated in full lines and the centre line N—R, to the position indicated in dotted lines by the centre line N—S, in Fig. 8, rollers 75 ride down the concave surfaces $e$ of the cam tracks 76 and 77 and over the end surfaces $g$ of the detents 80 and 81, so that the roll shell engaging extremities of the transfer elements 64 and 65 swing upwardly and engage the trunnions 70 of an empty roll shell A supported in the stationary saddles 201 and 202 on brackets 195 and 196. As the rollers 75 roll over the shoulders $h$ on the detents 80 and 81, the transfer elements 64 and 65 withdraw the empty roll shell A from its supporting saddles 201 and 202, following which the rollers 75 roll along the lower surfaces $k$ of the detents 80 and 81 and cause the said detents to swing upwardly and the surfaces $j$ thereof to abut the concave track surfaces $c$ of the said cam tracks 76 and 77. Continued retrogressive movement of the actuating arms 56 and 57 causes rollers 75 to roll off the detents 80 and 81 back on to the surfaces $c$ of the cam tracks 76 and 77 and to the position depicted in Fig. 6, immediately prior to which the trunnions 70 on the empty roll shell A carried by the said transfer elements are drawn through the openings $t$ between the arcuate surfaces 167 of each holding member 152 and 153 and the opposed arcuate surfaces U of the saddles 142 and 143, whereby the holding members 152 and 153 are forced by the said roll shell trunnions 70 to shift upwardly and permit seating of the said roll shell trunnions 70 in the saddles 142 and 143. It is to be understood that, following disengagement of the roll of material B from the roll shell supporting means at the inception of each transfer movement, said supporting means are lowered, by force of gravity, to the proper position to receive an empty roll shell A from the transfer elements, in the manner described, the position of the said roll shell supporting means being determined by the stop member 170 and the control lever 171, as heretofore set forth.

Retrogressive movement of the transfer elements 64 and 65 and the actuating arms 56 and 57 is determined by disengagement of the clutch 87 and subsequent stopping of the crankshaft 47 in the position shown in Figs. 1, 3, 5, 6 and 11. Just prior to completion of the retrogressive movement of the actuating arms 56 and 57, the roller 136 on the arm 135 abuts the cam surface 141 on the trip arm 138, which trip arm at this moment is in the position shown in Fig. 12, and in riding down the said cam surface forces the trip arm 138 to swing in the direction of arrow H, back to the position shown in Fig. 11. The shoulder 137 on the trip arm 138, drawn into the path of travel of the outer end of the arm 135, constitutes an abutment or stop for the arm 135, which determines rotation of the crankshaft 47 and retrogressive movement of the actuating arms 56 and 57. The shifting of the trip arm 138 and the shoulder 137 back into the path of travel of the arm 135 in the manner described, effected shifting of the clutch control element 111 in the direction indicated by arrow I, in Fig. 11, back to the position shown in the said view, and incidental shifting of the roller 105 by the cam 107 and resultant shifting of the sleeve 101 and disengagement of the clutch section 87$^b$ from the clutch section 87$^a$.

According to the preceding description, the relation of the machine components and mechanisms following actuation of the transfer means, are substantially as shown in Figs. 1, 2, 3, 4 and 5. The roll of material B, supported by the arms 187 and 188, is in winding contact with the secondary winding roll 50 and an empty roll shell A is supported in the saddles 142 and 143 by the holding members 152 and 153 above the primary winding roll 49.

The roll of material B continues to wind up until the machine operator is signalled from the stentering machine to watch for a seam in the material M being fed to the machine, or when the roll of material B in process of winding by the secondary winding roll reaches the required diameter, the machine operator swings the arms 240 and 241 forwardly and engages the pin 249 in the recess 250 in the link 251. Treadle lever 171 is then shifted to disengage the stop member 170 which permits the shaft 46 to rotate and the means supporting an empty roll shell A above the primary winding roll 49 to lower the empty roll shell supported thereby into peripheral contact with the material M in transit over said primary winding roll. The material M is pressed upwardly by the roller 248, clear of the primary winding roll 49, immediately behind the empty roll shell, so that when the wrapping bar 281 subsequently wraps the free end of the severed material M about the empty roll shell, it will force the material into the nip between the advancing material and the empty roll shell.

With the latch 251 engaged with the pin 249 and the empty roll shell A in winding contact with the material M in transit over the material winding roll 50, the machine is set to sever the material. To do this, the lever 236 is shifted upwardly, thereby elevating the member 227 and shifting the cam 233 from the pin 223. By thus removing the support for the pin 223, which normally held the claw clutch section 217 disengaged from the claw clutch section 219, the springs 220 shift section 217 of the claw clutch into engagement with section 219 thereof, whereby the sprocket 54 is coupled to the shaft 44 and effects rotation of the said shaft.

Rotation of the shaft 44 and the cams 212 and 213 thereon effects perpendicular movement of the rollers 210 and 211 and the severing knife 203. As the shaft 44 rotates, the pin 254 carried by the disc 255 and extending through the slot 252 in the link 251 causes the said link to lower and draw the bar 245 downwardly towards the material M. Cams 212 and 213 are shown in dotted lines in Fig. 9 in their lowermost position, with the central axis thereof in perpendicular alignment with the axis of shaft 44, as represented by the centre line T—U, in Fig. 9. In the position where the cams 212 and 213 have rotated to the position indicated by the axial line T—V, the edge of the bar 245 and the cutting points of the knife 203 are in slightly overlapped relation and the material severing operation is being effected. This is clearly shown in Fig. 10. Attention is also directed to the fact that in such position the pin 254 is in its lowermost position, thereby determining downward movement of the link 251 and bar 245. During rotation of the shaft 44 and cams 212 and 213 as above referred to, the pin 267 on the connecting arm 268 has advanced towards the shaft 45 in the direction of arrow $l$ to the end of the slot 266, following which the arm 265 rotated in the direction of arrow $m$ from the centre line position o—p to the centre line position o—q, which effected partial rotation of the shaft 45, turning of the sprockets 269 and 270, and movement of chains 275 and 276, and the wrapping bar 281 attached thereto, from the position shown in full lines in Fig. 9 and indicated at 281A, to the position likewise depicted in Fig. 10 and indicated at 281B. In the latter position, the wrapping bar 281 has advanced to the point where slight pressure is exerted thereby on material M. The material M is severed during the moment cams 212 and 213 swing from the axial position indicated by the line T—V to the axial position indicated by the line T—W. Simultaneously, the pin 254 advances to the position shown in dotted lines in Fig. 10 and the link 251 is elevated thereby to the position depicted in dotted lines in this figure. At the same time the arm 265 swings from the centre line position o—q to the centre line position o—r, which effects continued rotation of the shaft 45 and, during such action, the end of the material M feeding between the primary winding roll 49 and the empty roll shell A thereabove is picked up by the advancing wrapping bar 281, which shifts partially circumferentially about the said roll shell to the position indicated in dotted lines at 281C in Fig. 10, or in other words, to the position where it tucks the material overlapping said wrapping bar between the periphery of the rotating roll shell and the advancing material, whereby the material is caught and commences to wind about the roll shell A after withdrawal or retrogressive movement of the wrapping bar 281 incidental to continued rotation of the shaft 44. During retrogressive movement of the wrapping bar 281, the pin 254 abuts the link 251 at the end of the slot 252 and tilts the said link laterally, so that the pin 249 is released, thus permitting the arms 240 and 241 and the bar 245 to swing back to the position shown in Fig. 9 by reason of the action of gravity on the counterweights of said arms.

Rotation of the shaft 44, following the material severing and wrapping operations, is determined by the pin 223 riding up the cam 233 on the member 227 and effecting disengagement of the claw clutch section 217 from the claw clutch section 219, before abutment against the lug 234 on the member 227.

The roll of material B in process of winding on the roll shell A by the primary winding roll 49 continues to increase in diameter as heretofore set forth and the material roll transfer and material severing, wrapping and rewinding operations are repeated intermittently and successively in the manner described.

The manually operable control means for the transfer means includes the control lever 285 connected to the clutch control element 111 by the pin 287, shifting of which lever effects rectilineal displacement of the clutch control element 111 and incidental engagement of the sections of the clutch 87 in the manner described, ensuing shifting of the said clutch control means by the automatic feeler mechanism herein set forth.

The foregoing analysis will so fully reveal the gist of this invention that others can, by applying current engineering knowledge, readily adapt the same to reasonably accord with conventional textile or paper machinery design practice, without omitting certain features which fairly constitute essential characteristics of the generic or specific aspects of this invention, and therefore all such adaptations should and are intended to be comprehended within the meaning and range of equivalency of the following claims.

Having thus described my invention, what I claim is:—

1. In a machine for winding material of ribbon like form into rolls, the combination with a pair of material winding rolls driven at corresponding peripheral velocity and an empty roll shell disposed at a higher elevation than said winding rolls; of transfer means to engage the roll shell within a roll of material in process of winding through frictional contact with one said winding roll, pick up said roll of material, transport the same to and lower the same into peripheral contact with the other said winding roll, release said roll shell, shift upwardly and engage the said empty roll shell and lower the same into idling position above the first mentioned winding roll.

2. In a machine for winding material of ribbon like form into rolls, in combination, means to wind material on a roll shell; means to transfer a roll of material thus wound to an adjacent position and subsequently transfer an empty roll shell to the position occupied by said roll of material prior to its transfer; drive means to actuate said transfer means; and automatic timing means coacting with and responsive to movement of the roll shell disposed within the roll of material in process of winding prior to its transfer, for interconnecting said transfer means with said transfer means actuating means.

3. In a machine for winding material of ribbon like form into rolls, in combination, means to wind material on a roll shell in initial and subsecutive positions; transfer means to shift a roll of material from the initial material winding position to the subsecutive material winding position and to transfer an empty roll shell to the position occupied by said roll of material prior to its transfer; drive means to actuate said transfer means; and automatic timing means coacting with and responsive to movement of the roll shell disposed within the roll of material in process of winding prior to its transfer, for interconnecting said transfer means with said transfer means actuating means.

4. In a machine for winding material of ribbon like form into rolls, in combination, primary and secondary material winding rolls; transfer means to shift a roll of material wound up by said primary winding roll into winding contact with said secondary winding roll and subsequently transfer an empty roll shell to the position occupied by said roll of material prior to its transfer; drive means to actuate said transfer means; and automatic timing means coacting with and responsive to movement of the roll shell disposed within the roll of material in process of winding by said primary winding roll, for interconnecting said transfer means with said transfer means actuating means.

5. In a machine for winding material of ribbon like form into rolls, in combination, means to wind material on a roll shell; means to transfer a roll of material thus wound to an adjacent position and subsequently transfer an empty roll shell to the position occupied by said roll of material prior to its transfer; continuously operating drive means to actuate said transfer means; and automatic timing means coacting with and responsive to movement of the roll shell disposed within the roll of material in process of winding, for intermittently interconnecting said transfer means actuating means with said continuously operating drive means.

6. In a machine for winding material of ribbon like form into rolls, in combination, means to wind material on a roll shell in initial and subsecutive positions; transfer means to shift a roll of material from the initial material winding position to the subsecutive material winding position and subsequently transfer an empty roll shell to the initial material winding position; continuously operating drive means to actuate said transfer means; and automatic timing means coacting with and responsive to movement of the roll shell disposed within the roll of material in process of winding in the initial winding position, for intermittently interconnecting said transfer means actuating means with said continuously operating drive means.

7. In a machine for winding material of ribbon like form into rolls, in combination, primary and secondary material winding rolls; transfer means to shift a roll of material wound up by said primary winding roll into winding contact with said secondary winding roll and subsequently transfer an empty roll shell to the position occupied by said roll of material prior to its transfer; drive means to actuate said transfer means; and automatic timing means coacting with and responsive to movement of the roll shell disposed within the roll of material in process of winding by said primary winding roll, for intermittently interconnecting said transfer means actuating means with said continuously operating drive means.

8. In a machine for winding material of ribbon like form into rolls, in combination, means to wind material on a roll shell; means to transfer a roll of material thus wound to an adjacent position and subsequently transfer an empty roll shell to the position occupied by said roll of material prior to its transfer; drive means to actuate said transfer means; automatic timing means coacting with and responsive to movement of the roll shell disposed within the roll of material in process of winding prior to its transfer, for intermittently interconnecting said transfer means actuating means with said continuously operating drive means; and manually operable means to control said drive means independently of said automatic timing means.

9. In a machine for winding material of ribbon like form into rolls, in combination, means to wind material on a roll shell in initial and subsecutive positions; transfer means to shift a roll of material from the initial material winding position to the subsecutive material winding position and to transfer an empty roll shell to the position occupied by said roll of material prior to its transfer; drive means to actuate said transfer means; automatic timing means coacting with and responsive to movement of the roll shell disposed within the roll of material in process of winding, for interconnecting said transfer means with said transfer means actuating means; and manually operable means to control said drive means independently of said automatic timing means.

10. In a machine for winding material of ribbon like form into rolls, in combination, primary and secondary material winding rolls; transfer means to shift a roll of material wound up by said primary winding roll into winding contact with said secondary winding roll and subsequently transfer an empty roll shell to the position occupied by said roll of material prior to its transfer from said primary winding roll; drive means to actuate said transfer means; automatic timing means coacting with and responsive to movement of the shell disposed within the roll of material in process of winding by said primary winding roll, for intermittently interconnecting said transfer means actuating means with said drive means; and manually operable means to control said drive means independently of said automatic timing means.

11. In a machine for winding material of ribbon like form into rolls, in combination, means to wind material on a roll shell in initial and subsecutive winding positions; an empty roll shell disposed adjacent said material winding means; transfer means arranged to shift a roll of material from the initial material winding position to the subsecutive material winding position; and to transfer said empty roll shell to the position occupied by said roll of material prior to its transfer; continuously operating drive means to actuate said transfer means; automatic timing means coacting with and responsive to movement of the roll shell disposed within the roll of material in process of winding, for intermittently interconnecting said transfer means actuating means with said continuously operating drive means; and manually operable means to control said drive means independently of said automatic timing means.

12. In a machine for winding material of ribbon like form into rolls, in combination, means to wind material on a roll shell in initial and subsecutive positions; an empty roll shell disposed adjacent said material winding means; transfer means arranged to shift a roll of material from the initial material winding position to the subsecutive material winding position; and to lower said empty roll shell to the position occupied by said roll of material prior to its transfer; drive means to actuate said transfer means; automatic timing means coacting with and responsive to movement of the roll shell disposed within the roll of material in process of winding prior to its transfer, for interconnecting said transfer means with said transfer means actuating means; and manually operable means to control said drive means independently of said automatic timing means.

13. In a machine for winding material of ribbon like form into rolls, in combination, a pair of oscillatable material roll and roll shell transfer element actuating arms; a horizontally and vertically adjustable material roll and roll shell transfer element articulated with respect to each said actuating arm; stationary cam tracks engaging said transfer elements and adapted to impart material roll and roll shell engaging and releasing motions to said transfer elements upon oscillation of said actuating arms; means to oscillate said transfer element actuating arms; and means to control the last said means.

14. In a machine for winding material of ribbon like form into rolls, the combination with a pair of material winding rolls arranged in spaced relation; of transfer means for shifting a roll of material in process of winding from one said winding roll to the other said winding roll, including a pair of oscillatable material roll transfer element actuating arms; means to oscillate said actuating arms; manually operable control means to control oscillation of said actuating arms; a horizontally and vertically adjustable material roll transfer element articulated with respect to each said actuating arm; and stationary cam tracks engaging said material roll transfer elements and adapted to impart material roll engaging and releasing motions to said material roll transfer elements upon oscillation of said actuating arms.

15. In a machine for winding material of ribbon like form into rolls, the combination with a pair of material winding rolls arranged in spaced relation; of transfer means for shifting a roll of material in process of winding from one said material winding roll to the other said material winding roll, including two oscillatable material roll transfer element actuating arms arranged in spaced relation; horizontally and vertically adjustable cloth roll transfer elements articulated with respect to said actuating arms, adapted to engage the ends of material roll shells; stationary cam tracks engaging said material roll transfer elements and adapted to impart material roll engaging and releasing motions thereto upon oscillation of said actuating arms; means to oscillate said actuating arms; automatic timing means coacting with and responsive to movement of the roll shell disposed within a roll of material in process of winding by the first said winding roll, for interconnecting said transfer means with said transfer means actuating means; and automatic means to determine oscillation of said actuating arms upon completion of each complete cycle of oscillation of said actuating arms.

16. In a machine for winding material of ribbon like form into rolls, the combination with a pair of material winding rolls arranged in spaced relation; of transfer means for shifting a roll of material in process of winding from one said material winding roll to the other said material winding roll, including two oscillatable material roll transfer element actuating arms arranged in spaced relation; horizontally and vertically adjustable material roll transfer elements articulated with respect to said actuating arms adapted to engage the ends of material roll shells; stationary cam tracks engaging said material roll transfer elements and adapted to impart material roll engaging and releasing motions thereto upon oscillation of said actuating arms; drive means to oscillate said actuating arms; manually operable control means for interconnecting said drive means with said actuating arms; and automatic means to determine oscillation of said actuating arms upon completion of each complete cycle of oscillation of said actuating arms.

17. In a machine for winding material of ribbon like form into rolls, in combination, transfer means to intermittently and successively shift rolls of material in process of winding from initial winding positions to subsecutive winding positions, including transfer elements arranged in spaced relation and adapted to intermittently and successively engage and release the ends of material roll shells; powered driving means to impart progressive and retrogressive movements to said transfer elements; means coacting with said transfer elements to cause said transfer elements to engage a material roll shell during each respective transfer element progressive movement and to discharge the said material roll shell prior to completion of each respective transfer element retrogressive movement; and control means for said powered driving means.

18. In a machine for winding material of ribbon like form into rolls, the combination with a pair of material winding rolls; of transfer means to shift a roll of material wound up by one said winding roll into winding contact with the other said winding roll; drive means to actuate said transfer means; and automatic timing means coacting with and responsive to movement of the roll shell disposed within the roll of material in process of winding for interconnecting said transfer means with said transfer means actuating means.

19. In a machine for winding material of ribbon like form into rolls, the combination with a pair of material winding rolls; of transfer means to shift a roll of material wound up by one said winding roll into winding contact with the other said winding roll; drive means to actuate said transfer means; automatic timing means coacting with and responsive to movement of the roll shell disposed within the roll of material in process of winding, for interconnecting said transfer means with said transfer means actuating means; and manually operable means to control said drive means independently of said automatic timing means.

20. In a machine for winding material of ribbon like form into rolls, in combination, means to wind material on a roll shell in initial and subsecutive positions; transfer means to shift a roll of material from the initial material winding position to the subsecutive winding position and to transfer an empty roll shell to the position occupied by said roll of material prior to its transfer; drive means to actuate said transfer means; and automatic timing means responsive to increase in diameter of the roll of material in process of winding prior to its transfer, for interconnecting said transfer means with said transfer means actuating means.

21. In a machine for winding material of ribbon like form into rolls, in combination, means to wind material on a roll shell; means to transfer a roll of material thus wound to an adjacent position and subsequently transfer an empty roll shell to the position occupied by said roll of material prior to its transfer; drive means to actuate said transfer means; and automatic timing means responsive to increase in growth of the roll of material in process of winding prior to its transfer, for interconnecting said transfer means with said transfer means actuating means.

22. In a machine for winding material of ribbon like form into rolls, in combination, primary and secondary material winding rolls; transfer means to shift a roll of material wound up by said primary winding roll into winding contact with said secondary winding roll and subsequently transfer an empty roll shell to the position occupied by said roll of material prior to its transfer from said primary winding roll; powered drive means to actuate said transfer means; automatic timing means responsive to increase in growth of the roll of material in process of winding prior to its transfer, for intermittently interconnecting said transfer means actuating means with said powered drive means; and manually operable means to control said powered drive means independently of said automatic timing means.

23. In a machine for winding material of ribbon like form into rolls, in combination, means to wind material on a roll shell in initial and subsecutive winding positions; transfer means to engage a roll of material in process of winding in the initial winding position and shift said roll of material to the subsecutive winding position; and means responsive to increase in growth of the roll of material in process of winding in the initial winding position to control actuation of said transfer means to effect shifting of the roll of material from the initial to the subsecutive winding position after said roll of material has reached a predetermined diameter.

24. In a machine for winding material of ribbon like form into rolls, in combination, primary and secondary winding rolls arranged in spaced relation; transfer means for shifting a roll of material in process of winding from said primary winding roll to said secondary winding roll, including two oscillatable material roll transfer element actuating arms arranged in spaced relation; horizontally and vertically adjustable material roll transfer elements articulated with respect to said actuating arms adapted to engage the ends of material roll shells; stationary cam tracks engaging said material roll transfer elements and adapted to impart material roll engaging and releasing motions thereto upon oscillation of said actuating arms; means to oscillate said actuating arms including an intermittently actuated drive member, a normally continuously rotating drive shaft, and a speed reduction gear train including a control clutch for transmitting power from said drive shaft to said drive member; and means responsive to increase in growth of the roll of material in process of winding by said primary winding roll, to operate said clutch and effect transmission of power from said drive shaft to said drive member.

25. In a machine for winding material of ribbon like form into rolls, in combination, primary and secondary winding rolls arranged in spaced relation; transfer means for shifting a roll of material in process of winding from said primary material winding roll to said secondary material winding roll, including two oscillatable material roll transfer element actuating arms arranged in spaced relation; horizontally and vertically adjustable material roll transfer elements articulated with respect to said actuating arms adapted to engage the ends of material roll shells; stationary cam tracks engaging said material roll transfer elements and adapted to impart material roll engaging and releasing motions thereto upon oscillation of said actuating arms; means to oscillate said actuating arms including an intermittently actuated drive member, a normally continuously operating drive shaft and a speed reduction gear train including a control clutch for transmitting power from said drive shaft to said drive member; timing means responsive to increase in growth of the roll of material in process of winding by said primary material winding roll to operate said clutch and effect transmission of power from said drive shaft to said drive member; and means controlled by said means to oscillate said actuating arms, to disengage said clutch upon completion of each complete cycle of oscillation of said actuating arms.

26. In a machine for winding material of ribbon like form into rolls, in combination, primary and secondary winding rolls arranged in spaced relation; transfer means for shifting a roll of material in process of winding from said primary winding roll to said secondary winding roll, including two oscillatable material roll transfer element actuating arms arranged in spaced relation; horizontally and vertically adjustable material roll transfer elements articulated with respect to said actuating arms adapted to engage the ends of material roll shells; stationary cam tracks engaging said material roll transfer elements and adapted to impart material roll engaging and releasing motions thereto upon oscillation of said actuating arms; means to oscillate said actuating arms including an intermittently actuated drive member, a normally continuously rotating drive shaft, a speed reduction gear train including a control clutch for transmitting power from said drive shaft to said drive member, a clutch control element, feeler mechanism including a timing trigger adapted to contact with the roll of material in process of winding by said primary material winding roll to shift said feeler mechanism upon predetermined increase in diameter of said roll of material in process of winding, to actuate said clutch control element, operate said clutch and effect transmission of power from said drive shaft to said drive member.

27. In a machine for winding material of ribbon like form into rolls, in combination, primary and secondary winding rolls arranged in spaced relation; transfer means for shifting a roll of material in process of winding from said primary winding roll to said secondary winding roll, including two oscillatable material roll transfer element actuating arms arranged in spaced relation; horizontally and vertically adjustable material roll transfer elements articulated with respect to said actuating arms, adapted to engage the ends of material roll shells; stationary cam tracks engaging said material roll transfer elements and adapted to impart material roll engaging and releasing motions thereto upon oscillation of said actuating arms; means to oscillate said actuating arms including a crankshaft, a normally continuously operating drive shaft, power transmission means including a control clutch for transmitting power from said drive shaft to said crankshaft, and feeler mechanism adapted to engage a roll of material in process of winding by said primary winding roll, to shift said clutch and effect powering of said crankshaft through said power transmission means.

28. In a machine for winding material of ribbon like form into rolls, in combination, primary and secondary winding rolls arranged in spaced relation; transfer means for shifting a roll of material in process of winding from said primary winding roll to said secondary winding roll, including two oscillatable material roll transfer element actuating arms arranged in spaced relation; horizontally and vertically adjustable material roll transfer elements articulated with respect to said actuating arms adapted to engage the ends of material roll shells; stationary cam tracks engaging said material roll transfer elements and adapted to impart material roll engaging and releasing motions thereto upon oscillation of said actuating arms; means to oscillate said actuating arms including a crankshaft, a normally continuously operating drive shaft, a speed reduction gear train including a clutch for transmitting power from said drive shaft to said crankshaft, a clutch engaging and disengaging control element, normally continuously operating feeler mechanism adapted to engage and actuate said clutch control element, a timing trigger adapted to contact successively with rolls of material in process of winding by said primary winding roll and coacting with said feeler mechanism to shift the latter into engagement with said clutch control element and effect engagement of said clutch; and means on said crankshaft adapted to actuate said feeler mechanism to disengage said clutch following each complete revolution of said crankshaft.

29. In a machine for winding material of ribbon like form into rolls, in combination, primary and secondary material winding rolls arranged in spaced relation; material roll shell supporting means, to support a roll of material in process of winding in peripheral contact with said primary material winding roll; means to support an empty roll shell adjacent said winding roll; material roll shell supporting means, to support a roll of material in process of winding with said secondary material winding roll; transfer means to shift a roll of material in process of winding from said primary winding roll into winding contact with said secondary winding roll and subsequently transfer an empty roll shell supported by said empty roll shell supporting means, to said primary winding roll material roll shell supporting means; means to adjust the last said means to move the empty roll shell supported thereby into peripheral contact with material in contact with said primary winding roll; and means to control the last said means.

30. In a machine for winding material of ribbon like form into rolls, the combination with a material winding roll, of supporting means adapted to support an empty roll shell in peripheral contact with the material in transit and in peripheral contact with said winding roll; an idler sprocket mounted at each end of said supporting means, the axis of which is in alignment with the axis of an empty roll shell supported by said supporting means; a drive sprocket associated with each said idler sprocket; a drive chain trained over each said idler and drive sprocket; a material wrapping bar mounted on said drive chains in parallel relation with said winding roll, and adapted to be shifted partially around an empty roll shell supported by said supporting means; drive means for said chains to shift said wrapping bar; and control means for said drive means.

31. In a machine for winding material of ribbon like form into rolls, the combination with a material winding roll, of supporting means adapted to support an empty roll shell in peripheral contact with the material in transit and in peripheral contact with said winding roll; an idler sprocket mounted at each end of said supporting means, the axis of which is in alignment with the axis of an empty roll shell supported by said supporting means; a drive sprocket associated with each said idler sprocket; a drive chain trained over each said idler and drive sprocket; a material wrapping bar mounted on said drive chains in parallel relation with said winding roll, and adapted to be shifted partially around an empty roll shell supported by said supporting means; a normally continuously operating power transmission shaft; an intermittent motion transmitting shaft; drive means interconnecting said shafts including a manually operable clutch, motion transmitting means interconnecting said motion transmitting shaft and said drive sprockets, whereby the latter are partially rotated in one direction and subsequently reversed, upon each complete revolution of said motion transmitting shaft, whereby said wrapping bar is advanced partially about an empty roll shell supported by said supporting means to wrap the free end of the material in transit about said empty roll shell and is subsequently receded to its normal inoperative position.

32. In a machine for winding material of ribbon like form into rolls, the combination with a material winding roll, of supporting means adapted to support an empty roll shell in peripheral contact with the material in transit and in peripheral contact with said winding roll; an idler sprocket mounted at each end of said supporting means, the axis of which is in alignment with the axis of an empty roll shell supported by said supporting means; a drive sprocket associated with each said idler sprocket; a drive chain trained over each said idler and drive sprocket; a material wrapping bar mounted on said drive chains in parallel relation with said winding roll, and adapted to be shifted partially around an empty roll shell supported by said supporting means; a normally continuously operating power transmission shaft; an intermittent motion transmitting shaft; drive means interconnecting said shafts including a manually operable clutch and means to disengage said clutch following each successive complete revolution of said intermittent motion transmitting shaft; motion transmitting means interconnecting said motion transmitting shaft and said drive sprockets, whereby the latter are partially rotated in one direction and subsequently reversed, upon each complete revolution of said motion transmitting shaft, whereby said wrapping bar is advanced partially about an empty roll shell supported by said supporting means to wrap the free end of the material in transit about said empty roll shell and is subsequently receded to its normal inoperative position.

33. In a machine for winding material of ribbon like form into rolls, in combination, a pair of material winding rolls arranged in spaced relation; supporting means to support an empty roll shell above one of said winding rolls; a material severing knife mounted between said winding rolls; powered means to reciprocate said material severing knife; powered means arranged in opposed relation to said material severing knife and actuated in timed relation therewith, whereby the material in transit is pressed against said material severing knife during each material severing operation; material wrapping means co-ordinated in timed relation with said material severing means and adapted to engage one free end of the material severed by the aforesaid material severing knife and wrap the same about an empty roll shell supported by said supporting means and subsequently release said material and recede to normal inoperative position; and means to control operation of said material severing knife and wrapping means.

34. In a machine for winding material of ribbon like form into rolls, the combination with a pair of material winding rolls disposed in spaced relation and supporting means adapted to support an empty roll shell in parallel relation to one of said winding rolls and in peripheral contact with material in transit and in peripheral contact with the one said winding roll; of an idler sprocket mounted at each end of said supporting means, the axis of which is in alignment with the axis of an empty roll shell supported by said supporting means; a drive sprocket associated with each said idler sprocket; a drive chain trained over each said idler and drive sprockets; a material wrapping bar mounted on said drive chains in parallel relation with said winding rolls and adapted to be shifted partially concentrically about the axis of said drive sprockets; a normally continuously operating drive shaft; an intermittent motion transmitting shaft; drive means for imparting motion from said drive shaft to said intermittent motion transmitting shaft, including a manually operable clutch embodying means to automatically disengage said clutch following each successive complete revolution of said intermittent motion transmitting shaft; a reciprocatable material severing knife mounted between said winding rolls; means carried by said intermittent motion transmitting shaft to actuate said material severing knife; a material supporting bar normally supported clear of the material in transit, operable by means actuated by said intermittent motion transmitting shaft in timed relation with said material severing knife and advanced toward the material in timed relation with said material severing knife upon advancement of the latter during the material severing operation whereby the material in transit is pressed against said material severing knife; motion transmitting means interconnecting said intermittent motion transmitting shaft and said drive sprockets, whereby the latter are partially rotated in one direction immediately subsequently to advance of said material severing knife, and are subsequently reversed, upon each complete revolution of said intermittent motion transmitting shaft, whereby said wrapping bar is advanced partially about said empty roll shell supported by supporting means to wrap the free end of the material severed by said material severing means about the empty roll shell supported by said supporting means, and is subsequently receded to its normal inoperative position.

35. In a machine for winding material of ribbon like form into rolls, in combination means to wind material on a roll shell, and means to sever a wound up roll of material from the material advancing towards the roll of material in process of winding, including, a reciprocatable material severing knife; means to actuate said knife; movable material supporting means arranged and movable in opposed relation to said material severing knife; and means to simultaneously actuate said material supporting means and the said material severing knife whereby the material in transit is pressed against said material severing knife at the moment of the material severing operation.

36. In a machine for winding material of ribbon like form into rolls, in combination means to wind material on a roll shell, and means to sever a wound up roll of material from the material advancing towards the roll of material in process of winding, including, a reciprocatable material severing knife; means to actuate said knife; manually operable means to control actuation of said knife; movable material supporting means arranged and movable in opposed relation to said material severing knife; and means to actuate said material supporting means and the said material severing knife simultaneously whereby the material in transit is pressed against said material severing knife during each material severing operation.

37. In a machine for winding material of ribbon like form into rolls, in combination means to wind material on a roll shell, and means to sever a wound up roll of material from the material advancing towards the roll of material in process of winding, including, a reciprocatable material cutting knife arranged substantially at right angles to the material in transit to be severed; means to actuate said knife; movable material supporting means arranged in parallel relation with and movable in opposed relation to said material severing knife; and means to establish simultaneous co-action of said material supporting means with said material severing knife whereby the material in transit is pressed against said material severing knife during each material severing operation.

38. In a machine for winding material of ribbon like form into rolls, in combination, means to wind material on a roll shell in initial and subsecutive positions; transfer means to shift a roll of material from the initial material winding position to the subsecutive material winding position and subsequently transfer an empty roll shell to the position occupied by said roll of material prior to its transfer; drive means to actuate said transfer means; automatic timing means coacting with and responsive to movement of the roll shell, disposed within the roll of material in process of winding, for interconnecting said transfer means with said transfer means actuating means; means to sever the material in transit; automatic means coordinated in timed relation with said material severing means to wrap one free end of the severed material about said empty roll shell ensuing material severing operation; and manually operable control means for said material severing and wrapping means.

39. In a machine for winding material of ribbon like form into rolls, in combination, primary and secondary material winding rolls; transfer means to shift a roll of material wound up by said primary winding roll into winding contact with said secondary winding roll; means to transfer an empty roll shell and dispose the same over said primary winding roll; drive means to actuate said transfer means; automatic timing means coacting with and responsive to movement of the roll shell disposed within the roll of material in process of winding, for interconnecting said transfer means with said transfer means actuating mean; means to sever the material in transit; means to subsequently wrap one free end of the severed material about said empty roll shell; and manually operable control means for said material severing and wrapping means.

40. In a machine for winding material of ribbon like form into rolls, in combination, means to wind material on a roll in initial and subsecutive positions; transfer means to shift a roll of material from the initial material winding position to the subsecutive material winding position; an empty roll shell disposed adjacent said material winding means; means to transfer the said empty roll shell to the position occupied by said roll of material prior to its transfer; drive means to actuate said transfer means; automatic timing means coacting with and responsive to movement of the roll shell disposed within the roll of material in process of winding, for interconnecting said transfer means with said transfer means actuating means; manually operable means to control said drive means independently of said automatic timing means; means to sever the material in transit; automatic means coordinated in timed relation with said material severing means to wrap one free end of the severed material about the said empty roll shell following the material severing operation; and manually operable control means for said material severing and wrapping means.

41. In a machine for winding material of ribbon-like form into rolls, in combination, a pair of material winding rolls arranged in spaced relation; means to rotate said rolls at corresponding peripheral velocity; transfer means for shifting a roll of material in process of winding from one said material winding roll to the other said material winding roll, including two oscillatable material roll transfer element actuating arms arranged in spaced relation, horizontally and vertically adjustable material roll transfer elements articulated with respect to said actuating arms, adapted to engage the ends of the material roll shells; stationary cam tracks engaging said material roll transfer elements and adapted to impart material roll engaging and releasing motions thereto upon oscillation of said actuating arms; drive means to oscillate said actuating arms; manually operable control means for interconnecting said drive means with said actuating arms; automatic timing means coacting with and responsive to movement of the roll shell disposed within a roll of material in process of winding, for interconnecting said transfer means with said transfer means drive means, independently of said manually operable control means; automatic means to determine oscillation of said actuating arms upon completion of each complete cycle of oscillation of said actuating arms; a material severing knife mounted between said winding rolls; powered means to reciprocate said material severing knife; powered means arranged in opposed relation to said material severing knife and actuated in timed relation therewith, whereby the material in transit is pressed against said material severing knife during each material severing operation; supporting means adapted to support an empty roll shell in peripheral contact with the material in transit and in peripheral contact with one said winding roll; an idler sprocket mounted at each end of said supporting means, the axis of which is in alignment with the axis of an empty roll shell supported by said supporting means; a drive sprocket associated with each said idler sprocket; a drive chain trained over each said idler and drive sprockets; a material wrapping bar mounted on said drive chains in parallel relation with said winding roll and adapted to be shifted partially around an empty roll shell supported by said supporting means; a normally continuously operating power transmission shaft; an intermittent motion transmitting shaft; drive means interconnecting said shafts including a manually operable clutch and means to disengage said clutch following each successive complete revolution of said intermittent motion transmitting shaft; motion transmitting means interconnecting said motion transmitting shaft and said drive sprockets, whereby the latter are partially rotated in one direction and subsequently reversed, upon each complete revolution of said motion transmitting shaft, whereby said wrapping bar is advanced partially about an empty roll shell supported by said supporting means to wrap the free end of the material in transit about said empty roll shell and is subsequently receded to its normal inoperative position.

42. In a machine for winding material of ribbon like form into rolls, in combination, a pair of material winding rolls arranged in spaced relation; transfer means for shifting a roll of material in process of winding from one said material winding roll to the other said material winding roll, including two oscillatable material roll transfer element actuating arms arranged in spaced relation; horizontally and vertically adjustable material roll transfer elements articulated with respect to said actuating arms, adapted to engage the ends of material roll shells; stationary cam tracks engaging said material roll transfer elements and adapted to impart material roll engaging and releasing motions thereto upon oscillation of said actuating arms; means to oscillate said actuating arms; automatic timing means responsive to increase in growth of the roll of material in process of winding prior to said transfer, for interconnecting said transfer means with said means to oscillate said actuating arms; automatic means to determine oscillation of said actuating arms upon completion of each complete cycle of oscillation of said actuating means; a material severing knife mounted between said winding rolls; powered means to reciprocate said material severing knife; powered means arranged in opposed relation to said material severing knife and actuated in timed relation therewith, whereby the material in transit is pressed against said material severing knife during each material severing operation; supporting means to support an empty roll shell above one of said winding rolls; material wrapping means coordinated in timed relation with said material severing means and adapted to engage one free end of the material severed by the aforesaid material severing knife and wrap the same about an empty roll shell supported by said supporting means and subsequently release said material and recede to normally inoperative position; and means to control operation of said material severing knife and wrapping means.

43. In a machine for winding material of ribbon like form into rolls, in combination, means to wind material on a roll shell; means to transfer a roll of material thus wound to an adjacent position; drive means to actuate said transfer means; and automatic timing means coacting with and responsive to movement of the roll shell disposed within the roll of material in process of winding prior to its transfer, for interconnecting said transfer means with said transfer means actuating means.

44. In a machine for winding material of ribbon like form into rolls, in combination, primary and secondary material winding rolls; transfer means to shift a roll of material wound up by said primary winding roll into winding contact with said secondary winding roll; drive means to actuate said transfer means; and automatic timing means co-acting with and responsive to movement of the roll shell disposed within the roll of material in process of winding by said primary winding roll, for interconnecting said transfer means with said transfer means actuating means.

45. In a machine for winding material of ribbon like form into rolls, in combination, means to wind material on a roll shell in initial and subsecutive positions; transfer means arranged to shift a roll of material from the initial material winding position to the subsecutive material winding position; continuously operating powering means to actuate said transfer means; and timing means responsive to increase in the diameter of the roll of material in process of winding in the initial winding position, to adjust said continuously operating powering means to operate said transfer means.

46. In a machine for winding material of ribbon like form into rolls, in combination, means to wind material on a roll shell in initial and subsecutive positions; transfer means arranged to shift a roll of material from the initial material winding position to the subsecutive material winding position; continuously operating powering means to actuate said transfer means; and timing means responsive to increase in the diameter of the roll of material in process of winding in the initial winding position, to effect actuation of said transfer means by said continuously operating powering means.

47. In a machine for winding material of ribbon like form into rolls, in combination, means to wind material on a roll shell in initial and subsecutive positions; transfer means to shift a roll of material from the initial material winding position to the subsecutive material winding position; drive means to actuate said transfer means; automatic timing means coacting with and responsive to movement of the roll shell, disposed within the roll of material in process of winding, for interconnecting said transfer means with said driving means therefor; means to sever the material in transit; automatic means coordinated in timed relation with said material severing means to wrap one free end of the severed material about an empty roll shell disposed in the initial winding position; and manually operable control means for said material severing and wrapping means.

48. In a machine for winding material of ribbon like form into rolls, in combination, a material winding roll; an empty roll shell disposed in peripheral contact with material passing over said winding rolls; and wrapping means arranged to engage the free end of material feeding between said winding roll and said empty roll shell and advance partially circumferentially about said empty roll shell in a path at substantially equal radial distances from the axis of said empty roll shell whereby the material is wrapped closely about the roll shell so that creasing and wrinkling of material is avoided, advance the free end of the material carried thereby into contacting relation with the material in transit, and subsequently release the free end of the material, whereby the material may be wound up about said roll shell.

49. In a machine for winding material of ribbon like form into rolls, the combination with means arranged to wind material on a roll shell in initial and subsecutive positions, of transfer mechanism adapted to engage a roll of material in process of winding in the initial winding position and to shift the said roll of material to the subsecutive winding position; and powered driving means intermittently positively actuating the transfer mechanism to establish shifting of the roll of material at a speed substantially corresponding with the lineal speed of the material in transit.

50. In a machine for winding material of ribbon like form into rolls, the combination with means arranged to wind material on a roll shell in initial and subsecutive positions, of transfer mechanism adapted to engage a roll of material in process of winding in the initial winding position and to shift the said roll of material to the subsecutive winding position; powered driving mechanism positively actuating the transfer mechanism in such manner that the roll of material is transported from its initial winding position to a subsecutive winding position at a speed substantially corresponding with the lineal velocity of the material in transit; and means adapted to be manually actuated to control functioning of the said driving mechanism.

51. In a machine for winding material of ribbon like form into rolls, in combination, primary and secondary material winding rolls; transfer mechanism arranged to transport a roll of material wound up by the said primary roll into winding contact with the said secondary roll; and powered driving mechanism positively actuating the said transfer mechanism in such manner that the roll of material is transported from the primary winding roll to the secondary winding roll at a speed substantially the same as the velocity of movement of the material advancing to the roll of material in process of winding; and means adapted to be manually actuated to control functioning of the said driving mechanism.

52. In a machine for winding material of ribbon like form into rolls, in combination, means to wind material on a roll shell in initial and subsecutive positions; transfer means to shift a roll of material from the initial material winding position to the subsecutive material winding position; drive means to actuate said transfer means; automatic timing means coacting with and responsive to movement of the roll shell, disposed within the roll of material in process of winding, for interconnecting said transfer means with said transfer means actuating means; means to sever the material in transit; automatic means coordinated in timed relation with said material severing means to wrap one free end of the severed material about an empty roll shell ensuing material severing operation; and manually operable control means for said material severing and wrapping means.

53. In a machine for winding material of ribbon like form into rolls, in combination, primary and secondary material winding rolls; transfer means to shift a roll of material wound up by said primary winding roll into winding contact with said secondary winding roll; drive means to actuate said transfer means; automatic timing means coacting with and responsive to movement of the roll shell disposed within the roll of material in process of winding, for interconnecting said transfer means with said transfer means actuating means; means to sever the material in transit; means to subsequently wrap one free end of the severed material about an empty roll shell; and manually operable control means for said material severing and wrapping means.

54. In a machine for winding material of ribbon like form into rolls, in combination, means to wind material on a roll in initial and subsecutive positions; transfer means to shift a roll of material from the initial material winding position to the subsecutive material winding position; drive means to actuate said transfer means; automatic timing means coacting with and responsive to movement of the roll shell disposed within the roll of material in process of winding, for interconnecting said transfer means with said transfer means actuating means; manually operable means to control said drive means independently of said automatic timing means; means to sever the material in transit; automatic means co-ordinated in timed relation with said material severing means to wrap one free end of the severed material about an empty roll shell following the material severing operation; and manually operable control means for said material severing and wrapping means.

55. In a machine for winding material of ribbon like form into rolls, in combination, primary and secondary winding rolls arranged in spaced relation; transfer means for shifting a roll of material in process of winding from said primary winding roll to said secondary winding roll, including two oscillatable material roll transfer element actuating arms arranged in spaced relation; horizontally and vertically adjustable material roll transfer elements articulated with respect to said actuating arms adapted to engage the ends of material roll shells; stationary cam tracks engaging said material roll transfer elements and adapted to impart material roll engaging and releasing motions thereto upon oscillation of said actuating arms; means to oscillate said actuating arms including an intermittently actuated drive member, a normally continuously rotating drive shaft, and a speed reduction gear train including a control clutch for transmitting power from said drive shaft to said drive member.

56. In a machine for winding material of ribbon like form into rolls, in combination, primary and secondary winding rolls arranged in spaced relation; transfer means for shifting a roll of material in process of winding from said primary material winding roll to said secondary material winding roll, including two oscillatable material roll transfer element actuating arms arranged in spaced relation; horizontally and vertically adjustable material roll transfer elements articulated with respect to said actuating arms adapted to engage the ends of material roll shells; stationary cam tracks engaging said material roll transfer elements and adapted to impart material roll engaging and releasing motions thereto upon oscillation of said actuating arms; means to oscillate said actuating arms including an intermittently actuated drive member, a normally continuously operating drive shaft and a speed reduction gear train including a control clutch for transmitting power from said drive shaft to said drive member.

57. In a machine for winding material of ribbon like form into rolls, in combination, primary and secondary winding rolls arranged in spaced relation; transfer means for shifting a roll of material in process of winding from said primary winding roll to said secondary winding roll, including two oscillatable material roll transfer element actuating arms arranged in spaced relation; horizontally and vertically adjustable material roll transfer elements articulated with respect to said actuating arms, adapted to engage the ends of material roll shells; stationary cam tracks engaging said material roll transfer elements and adapted to impart material roll engaging and releasing motions thereto upon oscillation of said actuating arms; means to oscillate said actuating arms including a crank-shaft, a normally continuously operating drive shaft, and power transmission means including a control clutch for transmitting power from said drive shaft to said crankshaft.

58. In a machine for winding material of ribbon like from into rolls, in combination, primary and secondary material winding rolls; transfer mechanism arranged to transfer a roll of material wound up by the said primary roll into winding contact with the said secondary roll; and powering means for the said transfer mechanism arranged to adjust itself upon increase in growth of the roll of material, in process of winding, to a predetermined diameter, to actuate the transfer mechanism to cause shifting of the wound up roll of material from the said primary roll to the said secondary roll.

59. In a machine for winding material of ribbon like form into rolls, in combination, primary and secondary material winding rolls; a roll shell operatively co-related with the said primary roll and adapted to be rotated by coaction with material advancing over the primary winding roll to the secondary winding roll; a material wrapping device arranged in parallel relation with the said primary winding roll, adapted to engage and wrap a free end of material passing between the said primary winding roll and the said roll shell, partially circumferentially about and in contiguous relation with the latter, in a path at substantially equal radial distances from the axis of the said empty roll shell, whereby wrinkling and creasing of the material is avoided, and subsequently release the free end of the material.

60. In a machine for winding material of ribbon like form into rolls, in combination, primary and secondary material winding rolls; a roll shell adapted to be propelled by coaction with material advancing between it and the said primary roll; a mechanism arranged to engage a free end of material advancing between the said primary roll and the said roll shell, wrap the same uniformly about the greater part of the circumferential periphery of the said roll shell, and subsequently release the free end of the material; transfer mechanism arranged to transfer the roll of material wound upon the roll shell into winding contact with the said secondary winding roll; and actuating means for the said transfer mechanism arranged to be automatically adjusted upon increase in growth of the roll of material, in process of winding, to a predetermined diameter, to cause actuation of the transfer mechanism.

61. In a machine for winding material of ribbon like form into rolls, in combination, primary and secondary material winding rolls; a roll shell operatively co-related with the said primary roll and adapted to be rotated by coaction with material advancing over the said primary winding roll to the said secondary winding roll; a material wrapping device arranged in parallel relation with the said primary winding roll, adapted to engage and uniformly wrap a free end of material passing between the said primary winding roll and the said roll shell, partially circumferentially about the latter in a path at substantially equal radial distances from the axis of the said roll shell, and subsequently release the free end of the material; transfer mechanism arranged to shift the roll of material wound up by the said primary roll into winding contact with the said secondary roll, and actuating means for the said transfer mechanism arranged to be automatically adjusted upon increase in growth of the roll of material, in process of winding, to a predetermined diameter, to cause actuation of the said transfer mechanism.

62. In a machine for winding material of ribbon like form into rolls, in combination, primary and secondary material winding rolls; a roll shell operatively co-related with the said primary roll and adapted to be rotated by coaction with material advancing over the said primary winding roll to the said secondary winding roll; a material wrapping device arranged in parallel relation with the said primary winding roll, adapted to engage and uniformly wrap a free end of material passing between the said primary winding roll and the said roll shell, partially circumferentially about the latter in a path at substantially equal radial distances from the axis of the said roll shell, and subsequently release the free end of the material; transfer mechanism arranged to shift the roll of material wound up by the said primary roll into winding contact with the said secondary roll; actuating means to actuate the said transfer mechanism; and manually controllable means to govern coaction of the said actuating means and the said transfer mechanism.

63. In a machine for winding material of ribbon like form into rolls, in combination, spaced primary and secondary winding rolls; transfer means arranged to be operated to shift a roll of material wound up by the said primary winding roll into contact with the said secondary roll for further winding; continuously operating drive means adapted to intermittently actuate the said transfer means; and automatic timing means coacting with a roll shell in a roll of material in process of winding, prior to its transfer, and responsive to that movement of the roll shell which is due to the gradually increasing diameter of the material roll, said automatic timing means being operative to interconnect the said transfer means with the said drive means therefor as soon as the roll of material has reached a predetermined diameter.

64. In a machine for winding material of ribbon like form into rolls, in combination, means to wind material on a roll shell in initial and subsecutive positions; transfer means to shift a roll of material from the initial material winding position to the subsecutive material winding position; drive means to actuate said transfer means; and automatic timing means coacting with and responsive to movement of the roll shell disposed within the roll of material in process of winding prior to its transfer, for interconnecting said transfer means with said transfer means actuating means.

65. In a machine for winding material of ribbon like form into rolls, in combination, means to wind material on a roll shell; means to transfer a roll of material thus wound to an adjacent position; continuously operating drive means to actuate said transfer means; and automatic timing means coacting with and responsive to movement of the roll shell disposed within the roll of material in process of winding, for intermittently interconnecting said transfer means actuating means with said continuously operating drive means.

66. In a machine for winding material of ribbon like form into rolls, in combination, primary and secondary material winding rolls; transfer means to shift a roll of material wound up by said primary winding roll into winding contact with said secondary winding roll; continuously operating drive means to actuate said transfer means; and automatic timing means coacting with and responsive to movement of the roll shell disposed within the roll of material in process of winding by said primary winding roll, for intermittently interconnecting said transfer means actuating means with said continuously operating drive means.

67. In a machine for winding material of ribbon like form into rolls, in combination, means to wind material on a roll shell; means to transfer a roll of material thus wound to an adjacent position; continuously operating drive means to actuate said transfer means; automatic timing means coacting with and responsive to movement of the roll shell disposed within the roll of material in process of winding prior to its transfer, for intermittently interconnecting said transfer means actuating means with said continuously operating drive means; and manually operable means to control said drive means independently of said automatic timing means.

68. In a machine for winding material of ribbon like form into rolls, in combination, primary and secondary material winding rolls; transfer means to shift a roll of material wound up by said primary winding roll into winding contact with said secondary winding roll; drive means to actuate said transfer means; automatic timing means coacting with and responsive to movement of the shell disposed within the roll of material in process of winding by said primary winding roll, for intermittently interconnecting said transfer means actuating means with said drive means; and manually operable means to control said drive means independently of said automatic timing means.

69. In a machine for winding material of ribbon like form into rolls, the combination with a pair of material winding rolls arranged in spaced relation; of transfer means for shifting a roll of material in process of winding from one said material winding roll to the other said material winding roll, including two oscillatable material roll transfer element actuating arms arranged in spaced relation; horizontally and vertically adjustable cloth roll transfer elements articulated with respect to said actuating arms, adapted to engage the ends of material roll shells; means engaging said material roll transfer elements and adapted to impart material roll engaging and releasing motions thereto upon oscillation of said actuating arms; means to oscillate said actuating arms; automatic timing means coacting with and responsive to movement of the roll shell disposed within a roll of material in process of winding by the first said winding roll, for interconnecting said transfer means with said transfer means actuating means; and automatic means to determine oscillation of said actuating arms upon completion of each complete cycle of oscillation of said actuating arms.

70. In a machine for winding material of ribbon like form into rolls, the combination with a pair of material winding rolls arranged in spaced relation; of transfer means for shifting a roll of material in process of winding from one said material winding roll to the other said material winding roll, including two oscillatable material roll transfer element actuating arms arranged in spaced relation; horizontally and vertically adjustable material roll transfer elements articulated with respect to said actuating arms adapted to engage the ends of material roll shells; means engaging said material roll transfer elements and adapted to impart material roll engaging and releasing motions thereto upon oscillation of said actuating arms; manually operable control means for interconnecting said drive means with said actuating arms; and automatic means to determine oscillation of said actuating arms upon completion of each complete cycle of oscillation of said actuating arms.

71. In a machine for winding cloth of ribbon like form into rolls, in combination, primary and secondary material winding rolls arranged in spaced relation; and material severing means arranged to sever the material as it is advancing over the said primary winding roll, including a reciprocatable severing knife, material supporting means arranged to support the material at the moment the material is severed by the said knife, and means to cause simultaneous movement of the said knife and the said material supporting means whereby the said devices coact to sever the material.

72. In a machine for winding material of ribbon like form into rolls, in combination, primary and secondary material winding rolls arranged in spaced relation; and material severing means adapted to sever the material as it advances over the primary toward the secondary material winding roll, including a knife, arranged beneath the material in transit, when in its inoperative position, a material supporting device, arranged above the material in transit, when in its inoperative position, means adapted to be adjusted manually, to establish coaction of the said material supporting device and the said knife, and powered actuating mechanism arranged to cause the said material supporting device and the said knife to simultaneously advance toward the material in transit and to coact to effect severing of the material.

73. In a machine for winding material of ribbon like form into rolls, in combination, primary and secondary material winding rolls arranged in spaced relation; and material severing means adapted to sever the material as it advances over the primary toward the secondary material winding roll, including a knife, arranged beneath the material in transit, when in its inoperative position, a material supporting device, arranged above the material in transit, when in its inoperative position, means adapted to be adjusted manually, to establish coaction of the said material supporting device and the said knife, powered actuating mechanism arranged to cause the said material supporting device and the said knife to simultaneously advance toward the material in transit and to coact to effect severing of the material, and means arranged for manual control to govern operation of the said powered actuating mechanism.

JOHN J. LYTH.